United States Patent
Taherzadeh Boroujeni et al.

(10) Patent No.: US 12,261,786 B2
(45) Date of Patent: *Mar. 25, 2025

(54) BEAM-BASED PDCCH TRANSMISSION IN NR

(71) Applicant: InterDigital Patent Holdings, Inc., Wilmington, DE (US)

(72) Inventors: Mahmoud Taherzadeh Boroujeni, San Diego, CA (US); Oghenekome Oteri, San Diego, CA (US); Loic Canonne-Velasquez, Dorval (CA); Shahrokh Nayeb Nazar, San Diego, CA (US); Afshin Haghighat, Ile-Bizard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,911

(22) Filed: Sep. 22, 2023

(65) Prior Publication Data
US 2024/0014956 A1    Jan. 11, 2024

Related U.S. Application Data

(63) Continuation of application No. 16/609,478, filed as application No. PCT/US2018/030292 on Apr. 30, 2018, now Pat. No. 11,799,600.
(Continued)

(51) Int. Cl.
*H04W 4/00* (2018.01)
*H04L 5/00* (2006.01)

(52) U.S. Cl.
CPC .......... *H04L 5/0023* (2013.01); *H04L 5/0094* (2013.01)

(58) Field of Classification Search
CPC ... H04L 5/0023; H04L 5/0094; H04L 5/0048; H04L 5/0053; H04B 7/0617; H04B 7/0695
(Continued)

(56) References Cited

U.S. PATENT DOCUMENTS 8,774,104 B2    7/2014  Zeira et al.
9,313,782 B2    4/2016  Chen et al.
(Continued)

FOREIGN PATENT DOCUMENTS

CN    102395206 A    3/2012
CN    103326841 A    9/2013
(Continued)

OTHER PUBLICATIONS

R1-1700257, , "NR DL Control Channel Structure", ZTE, ZTE Microelectronics, 3GPP TSG RAN WG1 NR Ad-Hoc Meeting, Spokane, USA, Jan. 16-20, 2017, pp. 1-6.
(Continued)

*Primary Examiner* — Chuong T Ho
(74) *Attorney, Agent, or Firm* — Condo Roccia Koptiw LLP

(57) ABSTRACT

Systems, methods and instrumentalities are disclosed for beam-based PDCCH Transmission in NR. Control resource sets may be assigned for multi-beam control transmission. A PDCCH may be transmitted with multiple beams. CCEs may be mapped for multi-beam transmission. DCI may support multi-dimensional transmission with primary and secondary dimensions. Search space may support multi-beam, multi-TRP transmission.

19 Claims, 16 Drawing Sheets

Related U.S. Application Data

(60) Provisional application No. 62/500,645, filed on May 3, 2017, provisional application No. 62/519,555, filed on Jun. 14, 2017, provisional application No. 62/543,087, filed on Aug. 9, 2017, provisional application No. 62/599,124, filed on Dec. 15, 2017.

(58) Field of Classification Search
USPC .................................. 370/330, 329, 328
See application file for complete search history.

(56) References Cited

U.S. PATENT DOCUMENTS

| | | | |
|---|---|---|---|
| 9,473,965 | B2 | 10/2016 | Lee et al. |
| 9,794,913 | B2 | 10/2017 | Lee et al. |
| 9,867,186 | B2 | 1/2018 | Xu et al. |
| 9,918,335 | B2 | 3/2018 | Kim et al. |
| 10,165,582 | B2 | 12/2018 | Papasakellariou |
| 10,652,876 | B2 | 5/2020 | Seo et al. |
| 10,743,297 | B2 | 8/2020 | Nazar et al. |
| 11,026,253 | B2 * | 6/2021 | Venugopal ............ H04L 5/0053 |
| 11,218,271 | B2 | 1/2022 | Xiong et al. |
| 11,799,600 | B2 * | 10/2023 | Boroujeni ............ H04B 7/0695 |
| 2012/0282936 | A1 | 11/2012 | Gao et al. |
| 2013/0021994 | A1 | 1/2013 | Ji et al. |
| 2013/0039284 | A1 | 2/2013 | Marinier et al. |
| 2013/0039824 | A1 | 2/2013 | Abu-sharkh |
| 2013/0242882 | A1 | 9/2013 | Blankenship et al. |
| 2014/0286297 | A1 | 9/2014 | Zhao et al. |
| 2014/0328295 | A1 | 11/2014 | Ko et al. |
| 2015/0092646 | A1 | 4/2015 | Tabet et al. |
| 2016/0113008 | A1 | 4/2016 | Damnjanovic et al. |
| 2016/0242203 | A1 | 8/2016 | You et al. |
| 2017/0013626 | A1 | 1/2017 | Nan et al. |
| 2017/0332359 | A1 | 11/2017 | Tsai et al. |
| 2017/0353963 | A1 | 12/2017 | Hong et al. |
| 2017/0359807 | A1 | 12/2017 | Hong et al. |
| 2018/0198650 | A1 | 7/2018 | Nogami et al. |
| 2018/0227102 | A1 | 8/2018 | John Wilson et al. |
| 2018/0227156 | A1 | 8/2018 | Papasakellariou |
| 2018/0227887 | A1 | 8/2018 | Hakola et al. |
| 2018/0254853 | A1 | 9/2018 | Jung et al. |
| 2018/0279135 | A1 | 9/2018 | Hwang et al. |
| 2018/0279273 | A1 | 9/2018 | Yang et al. |
| 2018/0324816 | A1 | 11/2018 | Islam et al. |
| 2018/0368116 | A1 | 12/2018 | Liao et al. |
| 2019/0020506 | A1 | 1/2019 | Cheng et al. |
| 2019/0028234 | A1 | 1/2019 | Seo et al. |
| 2019/0037540 | A1 | 1/2019 | Seo et al. |
| 2019/0103941 | A1 | 4/2019 | Seo et al. |
| 2019/0132851 | A1 | 5/2019 | Davydov et al. |
| 2019/0158205 | A1 | 5/2019 | Sheng et al. |
| 2019/0173622 | A1 | 6/2019 | Xiong et al. |
| 2019/0253308 | A1 | 8/2019 | Huang et al. |
| 2019/0268208 | A1 | 8/2019 | Seo et al. |
| 2019/0297602 | A1 | 9/2019 | You et al. |
| 2019/0305867 | A1 | 10/2019 | Tseng et al. |
| 2019/0335492 | A1 * | 10/2019 | Venugopal ............ H04W 72/51 |
| 2019/0349960 | A1 | 11/2019 | Li et al. |
| 2020/0008231 | A1 | 1/2020 | Vilaipornsawai et al. |
| 2020/0028651 | A1 | 1/2020 | Xu |
| 2020/0029310 | A1 | 1/2020 | Lee et al. |
| 2020/0036497 | A1 | 1/2020 | Xu |
| 2020/0119895 | A1 | 4/2020 | Choi et al. |
| 2020/0145079 | A1 | 5/2020 | Marinier et al. |
| 2020/0154295 | A1 | 5/2020 | Lin |
| 2020/0252957 | A1 | 8/2020 | Cai et al. |
| 2020/0389847 | A1 | 12/2020 | Deng et al. |
| 2021/0112533 | A1 | 4/2021 | Tang |
| 2021/0227572 | A1 | 7/2021 | Miao et al. |
| 2022/0070909 | A1 | 3/2022 | Takeda et al. |
| 2023/0217278 | A1 | 7/2023 | Xu et al. |

FOREIGN PATENT DOCUMENTS

| | | |
|---|---|---|
| CN | 103650618 A | 3/2014 |
| CN | 103828282 A | 5/2014 |
| CN | 103916962 A | 7/2014 |
| CN | 104081709 A | 10/2014 |
| CN | 104823475 A | 8/2015 |
| CN | 105162565 A | 12/2015 |
| CN | 106888079 B | 3/2021 |
| GB | 2568486 A | 5/2019 |
| JP | 2016518091 A | 6/2016 |
| RU | 2521486 C2 | 6/2014 |
| TW | 201342860 A | 10/2013 |
| TW | 201709706 A | 3/2017 |
| WO | 2009006016 A2 | 1/2009 |
| WO | 2009046061 A2 | 4/2009 |
| WO | 2009158050 A2 | 12/2009 |
| WO | 2011066793 A1 | 6/2011 |
| WO | 2013141530 A1 | 9/2013 |
| WO | 2014121641 A1 | 8/2014 |
| WO | 2016022849 A1 | 2/2016 |
| WO | 2017160100 A2 | 9/2017 |
| WO | 2017171327 A2 | 10/2017 |
| WO | 2017173038 A1 | 10/2017 |
| WO | 2018204282 A1 | 11/2018 |

OTHER PUBLICATIONS

R1-1700346, , "On Beam State Reporting", Intel Corporation, 3GPP TSG RAN WG1 NR Ad-Hoc Meeting, Spokane, USA, Jan. 16-20, 2017, pp. 1-6.
R1-1704202, , "Search Space Design Considerations", 3GPP TSG RAN WG1 Meeting #88bis; Huawei, HiSilicon; Spokane, USA, Apr. 3-7, 2017, 4 pages.
R1-1704618, , "Search Space Design Consideration for NR PDCCH with BF", Guangdong OPPO Mobile Telecom, 3GPP TSG RAN WG1 Meeting #88bis, Spokane, Washington, Apr. 3-7, 2017, 8 pages.
R1-1704950, , "Search Space Design for NR-PDCCH", ETRI, 3GPP TSG RAN WG1 #88bis, Spokane, USA, Apr. 3-7, 2017, pp. 1-4.
R1-1705583, , "Control Channel Multi-Beam Operation", 3GPP TSG-RAN WG1 #88bis; Qualcomm Incorporated; Spokane, USA, Apr. 3-7, 2017, 4 pages.
R1-1708333, , "On Multi-TRP/Panel Transmission for DL", InterDigital Inc., 3GPP TSG RAN WG1 Meeting #89, Hangzhou, China, May 15-19, 2017, 4 pages.
R1-1708345, , "Design Considerations for Beam-Based PDCCH", InterDigital Inc., 3GPP TSG RAN WG1 Meeting #89, Hangzhou, China, May 15-19, 2017, pp. 1-4.
R1-1710923, , "DCI Design for Multi-TRP/Panel Transmission for DL", InterDigital Inc., 3GPP TSG RAN WG1 Meeting NRAH2, Qingdao, China, Jun. 27-30, 2017, 3 pages.
R1-1710944, , "On the Impact of Multi-Beam Operation on PDCCH Structure", InterDigital Inc., 3GPP TSG RAN WG1 NR Ad-Hoc#2, Qingdao, China, Jun. 27-30, 2017, pp. 1-5.
TS 36.211 V10.0.0, , "3rd Generation Partnership Project (3GPP)", Technical Specification Group Radio Access Network, Evolved Universal Terrestrial Radio Access (E-UTRA), Physical Channels and Modulation (Release 10), Dec. 2010, pp. 1-103.
TS 36.213 V14.2.0, , "3rd Generation Partnership Project (3GPP)", Technical Specification Group Radio Access Network, Evolved Universal Terrestrial Radio Access (E-UTRA), Physical Layer Procedures (Release 14), Mar. 2017, pp. 1-454.
3rd Generation Partnership Project(3GPP), R1-1705718, "Views on beam management framework", 3GPP TSG RAN WG1, Meeting #88bis, NTT DOCOMO, Inc. Spokane, USA, Apr. 3-7, 2017, 8 pages.
TS 36.211 V15.3.0, , "3rd Generation Partnership Project (3GPP)", Technical Specification Group Radio Access Network, Evolved Universal Terrestrial Radio Access (E-UTRA), Physical channels and modulation (Release 15), Sep. 2018, pp. 1-237.
IEEE Standard for Information technology—Telecommunications and Information Exchange between Systems—Local and Metro-

(56) References Cited

OTHER PUBLICATIONS politan Area Networks—Specific Requirements, Part 11: Wireless LAN Medium Access Control (MAC) and Physical Layer (PHY) Specifications, Amendment 4: Enhancements for Very High Throughput for Operation in Bands below 6GHZ, IEEE Std 802.11ac-2013, Dec. 11, 2013, 425 pages.
IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications-A, IEEE Std 802.11 n-2009, Sep. 2009, pp. 1-536.
IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Std. 802.11-2016, Dec. 7, 2016, pp. 1-3534.
IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 5: Television White Spaces (TVWS) Operation, IEEE 802.11af-2013, Dec. 11, 2013, 198 pages.
IEEE Standard for Information technology—Telecommunications and Information Exchange between Systems Local and Metropolitan Area Networks Specific Requirements, Part 11: Wireless LAN Medium Access Control (MAC) and Physical Layer (PHY) Specifications; Amendment 2: Sub 1 GHz License Exempt Operation, IEEE P802.11ah-2016, Dec. 7, 2016, 594 pages.
$3^{rd}$ Generation Partnership Project (3GPP), R1-1700661, "Discussion on Reference Signal in Mini-Slot", Fujitsu, TSG-RAN WG1 #NR AH Spokane, USA, Jan. 16-20, 2017, pp. 1-4.
$3^{rd}$ Generation Partnership Project (3GPP), R1-1704632, "On Multiplexing eMBB and URLLC in DL", Guangdong OPPO Mobile Telecom, 3GPP TSG RAN WG1 meeting #88bis, Spokane, Washington, USA, Apr. 3-7, 2017, 4 pages.
$3^{rd}$ Generation Partnership Project (3GPP), R1-1708979, "Impact on eMBB DMRS puncturing by URLLC burst", Wilus Inc., 3GPP TSG RAN WG1 Meeting #89, Hangzhou, P.R. China, May 15-19, 2017, pp. 1-6.
$3^{rd}$ Generation Partnership Project (3GPP), R1-1708980, "Pre-Emption Indication on DL Multiplexing between eMBB and URLLC", Wilus Inc., 3GPP TSG RAN WG1 Meeting #89, Hangzhou, P.R. China, May 15-19, 2017, 3 pages.
$3^{rd}$ Generation Partnership Project (3GPP), R1-1709986, "PDCCH Reliability for URLCC", Huawei, HiSilicon, 3GPP TSG RAN WG1 NR Ad Hoc Meeting, Qingdao, China, Jun. 27-30, 2017, 7 pages.
$3^{rd}$ Generation Partnership Project (3GPP), R1-1712394, "Discussion on multi-beam operation for NR-PDCCH", 3GPP TSG RAN WG1 Meeting #90; Prague, Czechia; Agenda item: 6.1.3.1.2.3; Source: CATT, Aug. 21-25, 2017, 5 pages.
$3^{rd}$ Generation Partnership Project (3GPP), R1-1715517, "Consideration on Monitoring Preemption Indication in Bandwidth Parts", Spreadtrum Communications, 3GPP TSG RAN WG1 Meeting AdHoc #3, Nagoya, Japan, Sep. 18-21, 2017, 2 pages.
$3^{rd}$ Generation Partnership Project (3GPP), R1-1716325, "Multiplexing of Different Data Channel Durations", Intel Corporation, 3GPP TSG RAN WG1 Meeting NR#3, Nagoya, Japan, Sep. 18-21, 2017, 8 pages.
$3^{rd}$ Generation Partnership Project (3GPP), R1-1717838, "Remaining Details of Pre-Emption Indication", CATT, 3GPP TSG RAN WG1 Meeting #90bis, Prague, Czechia, Oct. 9-13, 2017, 7 pages.
$3^{rd}$ Generation Partnership Project (3GPP), R1-1717955, "Discussion on DL Control with Ultra-Reliability Requirement", LG Electronics, 3GPP TSG RAN WG1 Meeting 90bis Prague, CZ, Oct. 9-13, 2017, pp. 1-4.
$3^{rd}$ Generation Partnership Project (3GPP), R1-1718323, "Discussions on Search Space and CoreSet Designs", MediaTek Inc., 3GPP TSG RAN WG1 Meeting #90bis, Prague, CZ, Oct. 9-13, 2017, 11 pages.

$3^{rd}$ Generation Partnership Project (3GPP), R1-1719402, "Remaining aspects on pre-emption indication for DL multiplexing of URLLC and eMBB", Huawei, HiSilicon, 3GPP TSG RAN WG1 Meeting #91, Reno, USA, Nov. 27-Dec. 1, 2017, 10 pages.
$3^{rd}$ Generation Partnership Project (3GPP), R1-1719587, "Remaining Issues on Pre-Emption Indication", MediaTek Inc., 3GPP TSG RAN1 WG1 Meeting #91, Reno, Nevada, USA, Nov. 27-Dec. 1, 2017, 6 pages.
$3^{rd}$ Generation Partnership Project (3GPP), R1-1721054, "NR PDCCH search space and number of BDs/CCEs per slot", 3rd Generation Partnership Project (3GPP); 3GPP TSG RAN WG1 Meeting #91; ZTE, Sanechips; Reno, USA, Nov. 27-Dec. 1, 2017, 5 pages.
$3^{rd}$ Generation Partnership Project (3GPP), R1-1800130, "Search space design and related issues", 3rd Generation Partnership Project (3GPP); 3GPP TSG RAN WG1 Meeting AH 1801; ZTE, Sanechips; Vancouver, Canada, Jan. 22-26, 2018, 9 pages.
$3^{rd}$ Generation Partnership Project (3GPP), R1-1800600, "Considerations for Ultra-Reliable DCI Transmission", InterDigital, Inc., 3GPP TSG RAN WG1 Meeting AH 1801, Vancouver, Canada, Jan. 22-26, 2018, 3 pages.
$3^{rd}$ Generation Partnership Project (3GPP), R1-1801338, "Summary of remaining issues on PDCCH monitoring with TP", 3rd Generation Partnership Project (3GPP); 3GPP TSG RAN WG1 Meeting #92; Huawei, HiSilicon; Athens, Greece, Feb. 26-Mar. 2, 2018, 4 pages.
$3^{rd}$ Generation Partnership Project (3GPP), R1-1802615, "Remaining Details on Paging", InterDigital Inc., 3GPP TSG RAN WG1 Meeting #92, Athens, Greece, Feb. 26-Mar. 2, 2018, 5 pages.
$3^{rd}$ Generation Partnership Project (3GPP), R1-1804841, "Remaining Details for Paging Channel", InterDigital Inc., 3GPP TSG RAN WG1 Meeting #92bis, Sanya, China, Apr. 16-20, 2018, 7 pages.
$3^{rd}$ Generation Partnership Project (3GPP), R1-1804888, "On Paging for NR Unlicensed Spectrum", InterDigital Inc., 3GPP TSG RAN WG1 Meeting #92bis, Sanya, China, Apr. 16-20, 2018, 3 pages.
$3^{rd}$ Generation Partnership Project (3GPP), R1-1807010, "On Remaining Details of NR Paging Channel", InterDigital Inc., 3GPP TSG RAN WG1 Meeting #93, Busan, South Korea, May 21-25, 2018, 3 pages.
$3^{rd}$ Generation Partnership Project (3GPP), R1-1807037, "On Initial Access for NR Unlicensed Spectrum", InterDigital Inc., 3GPP TSG RAN WG1 Meeting #93, Busan, South Korea, May 21-25, 2018, 6 pages.
"3rd Generation Partnership Project (3GPP)", TS 36.211 V14.5.0, Technical Specification Group Radio Access Network, Evolved Universal Terrestrial Radio Access (E-UTRA), Physical Channels and Modulation, (Release 14), Dec. 2017, pp. 1-197.
"3rd Generation Partnership Project (3GPP)", TS 36.211 V14.8.0, Technical Specification Group Radio Access Network, Evolved Universal Terrestrial Radio Access (E-UTRA), Physical Channels and Modulation (Release 14), Sep. 2018, 199 pages.
"3rd Generation Partnership Project (3GPP)", TS 36.211 V15.3.0, Technical Specification Group Radio Access Network, Evolved Universal Terrestrial Radio Access (E-UTRA), Physical Channels and Modulation, (Release 15), Sep. 2018, pp. 1-237.
"3rd Generation Partnership Project (3GPP)", TS 36.211 V2.0.0, Technical Specification Group Radio Access Network, Evolved Universal Terrestrial Radio Access (E-UTRA), Physical Channels and Modulation (Release 8), Sep. 2007, pp. 1-49.
"3rd Generation Partnership Project (3GPP)", TS 36.213 V14.4.0, Technical Specification Group Radio Access Network, Evolved Universal Terrestrial Radio Access (E-UTRA), Physical Layer Procedures (Release 14), Sep. 2017, pp. 1-462.
"3rd Generation Partnership Project (3GPP)", TS 36.213 V14.8.0, Technical Specification Group Radio Access Network, Evolved Universal Terrestrial Radio Access (E-UTRA), Physical layer procedures (Release 14), Sep. 2018, 468 pages.
"3rd Generation Partnership Project (3GPP)", TS 36.213 V15.3.0, Technical Specification Group Radio Access Network, Evolved Universal Terrestrial Radio Access (E-UTRA), Physical Layer Procedures, (Release 15), Sep. 2018, pp. 1-546.
"3rd Generation Partnership Project (3GPP)", TS 36.213 V2.0.0, Technical Specification Group Radio Access Network, Evolved

(56) References Cited

OTHER PUBLICATIONS

Universal Terrestrial Radio Access (E-UTRA), Physical Layer Procedures (Release 8), Sep. 2007, pp. 1-13.
"3rd Generation Partnership Project (3GPP)", TS 38.213 V15.3.0, Technical Specification Group Radio Access Network, NR, Physical Layer Procedures for Control (Release 15), Sep. 2018, pp. 1-101.
"3rd Generation Partnership Project (3GPP)", TS 38.331 V15.0.0, Technical Specification Group Radio Access Network NR Radio Resource Control (RRC) Protocol Specification (Release 15), Dec. 2017, pp. 1-188.
"3rd Generation Partnership Project (3GPP)", TS 38.331 V15.3.0, Technical Specification Group Radio Access Network, NR, Radio Resource Control (RRC) protocol specification, (Release 15), Sep. 2018, pp. 1-445.
$3^{rd}$ Generation Partnership Project, 3GPP, R1-1701715, "Beam Diversity for Data and Control Channels", 3GPP TSG RAN WG1 Meeting #88; Athens, Greece; Agenda Item: 8.1.2.2.1; Source: Huawei, HiSilicon, Feb. 12-17, 2017, 6 pages.
$3^{rd}$ Generation Partnership Project, 3GPP R1-1720231, "PDCCH design for multi-beam operation", 3GPP TSG RAN WG1 Meeting #91; Source: ETRI; Agenda Item: 7.3.1.5, Nov. 1-Dec. 2017, 6 pages.

\* cited by examiner

BEAM-BASED PDCCH TRANSMISSION IN NR

CROSS REFERENCE TO RELATED APPLICATION

This application is a continuation of U.S. patent application Ser. No. 16/609,478, filed Oct. 30, 2019, which is the National Stage Entry under 35 U.S.C. § 371 of Patent Cooperation Treaty Application No. PCT/US2018/030292, filed Apr. 30, 2018, which claims the benefit of U.S. Provisional Application No. 62/500,645, filed May 3, 2017, U.S. Provisional Application No. 62/519,555, filed Jun. 14, 2017, U.S. Provisional Application No. 62/543,087, filed Aug. 9, 2017, and U.S. Provisional Application No. 62/599,124, filed Dec. 15, 2017, the contents of which are incorporated by reference herein their entireties.

BACKGROUND

Mobile communications continue to evolve. A fifth generation may be referred to as 5G. A previous (legacy) generation of mobile communication may be, for example, fourth generation (4G) long term evolution (LTE). Mobile wireless communications implement a variety of radio access technologies (RATs), such as New Radio (NR). Use cases for NR may include, for example, extreme Mobile Broadband (eMBB), Ultra High Reliability and Low Latency Communications (URLLC) and massive Machine Type Communications (mMTC).

SUMMARY

Systems, methods and instrumentalities are disclosed for beam-based PDCCH Transmission in NR. A beam-based control resource set (CORESET or coreset) configuration may be used. Control resource sets may be assigned for multi-beam control transmission. A PDCCH may be transmitted with multiple beams. CCEs may be mapped for multi-beam transmission. Per-symbol interleaving and across symbol interleaving may be used. The effective search space may be reduced for per-symbol interleaving. DCI may support multi-dimensional transmission with primary and secondary dimensions. Search space may support multi-beam, multi-TRP transmission.

A wireless transmit/receive unit (WTRU) may have a computer processor that is configured to determine a PDCCH. The WTRU processor be configured to receive a PDCCH transmission, from a wireless communication system, that includes a control resource set (CORESET) configuration comprising a resource group (REG) bundle; determine whether the REG bundle is interleaved within symbols or across symbols; detect the REG bundle using a beam corresponding to the REG bundle, if the WTRU determined that the REG bundle is interleaved across symbols; and/or determine a multibeam PDCCH using the detected REG bundle and multiple beams associated with the PDCCH transmission.

The WTRU processor may be configured to determine that a received REG bundle is bundled in frequency, thereby indicating to the WTRU that the PDCCH transmission is a multibeam transmission.

The WTRU processor may be configured to detect the REG bundle using a beam corresponding to the REG bundle and quasi collocated (QCL) information for the REG bundle, if the WTRU determined that the REG bundle is interleaved across symbols.

The WTRU processor may be configured to determine that the received PDCCH transmission is a multibeam transmission by determining that the WTRU received a plurality of QCL information corresponding to multiple OFDM symbols in the received PDCCH transmission.

The CORESET configuration may include one or more of a CORESET size, a type of REG bundling, a transmission mode, a set of aggregation levels, a set of DCI information sizes, a number of PDCCH candidates, the QCL information, and an indication of whether the CORESET is single-beam or multibeam. The QCL information may include one or more of average gain, average delay, doppler shift, doppler spread, and spatial receiver parameters. The CORESET configuration may include an indication of a mode of interleaving REG bundles.

The WTRU processor may be configured to detect the REG bundle using PBCH/SYNC beam tracking if the WTRU determined that the REG bundle was interleaved within symbols.

The WTRU processor may be configured to determine a single-beam PDCCH using deinterleaving of the detected REG bundle.

The WTRU processor may be configured to determine, from the CORESET configuration whether the mode of interleaving REG bundles is one of time-first bundling without interleaving, time first bundling with interleaving, frequency first bundling with per-symbol interleaving, and frequency first bundling with across symbol interleaving.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
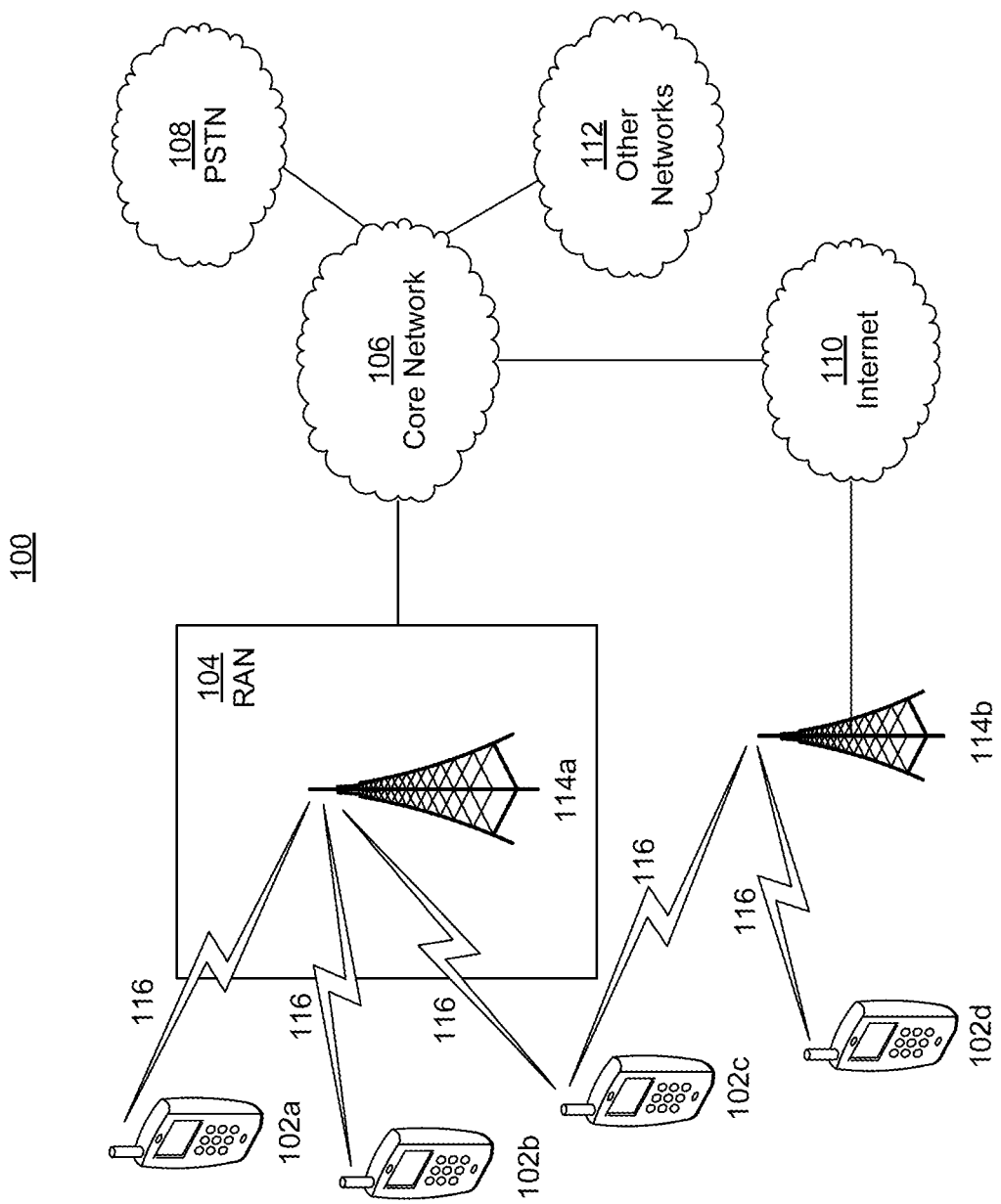
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
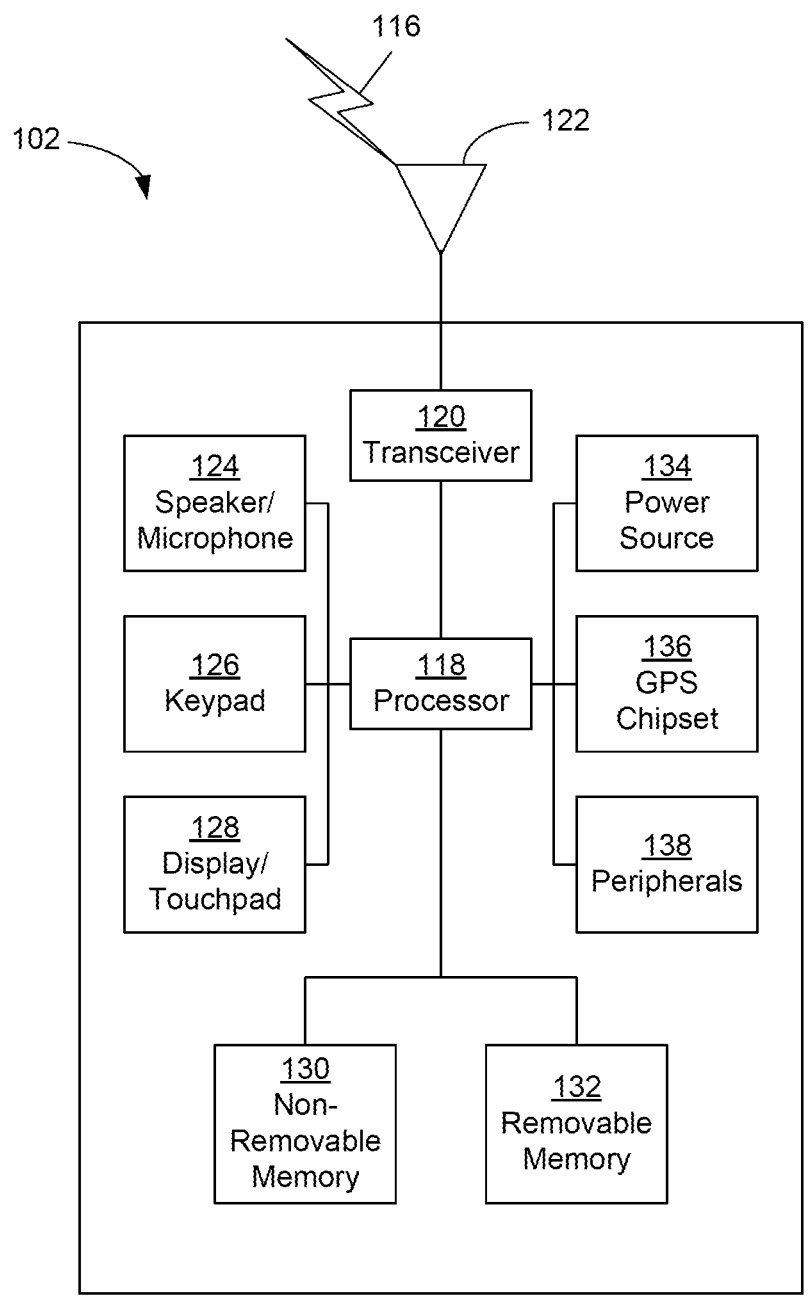
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
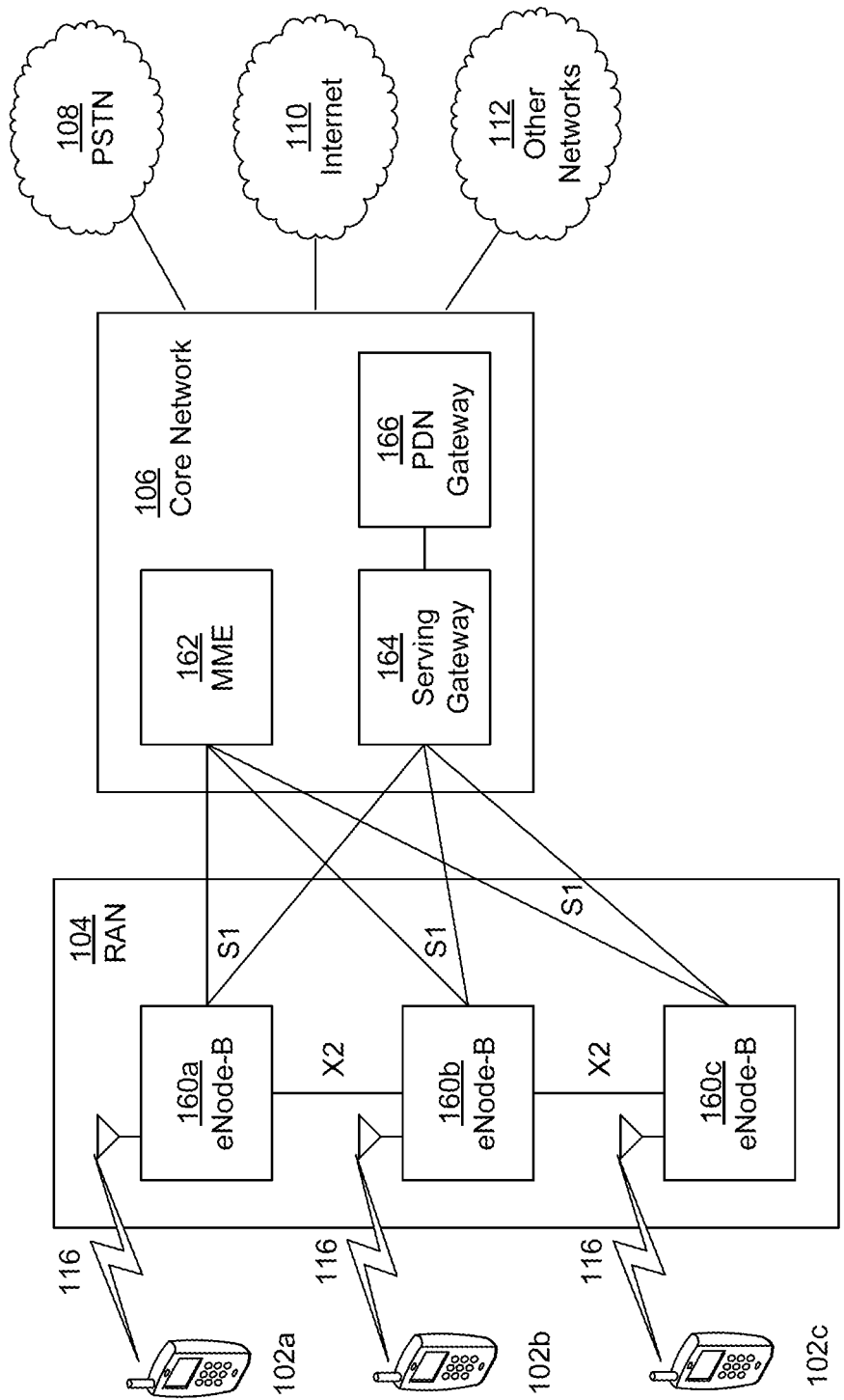
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11 ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
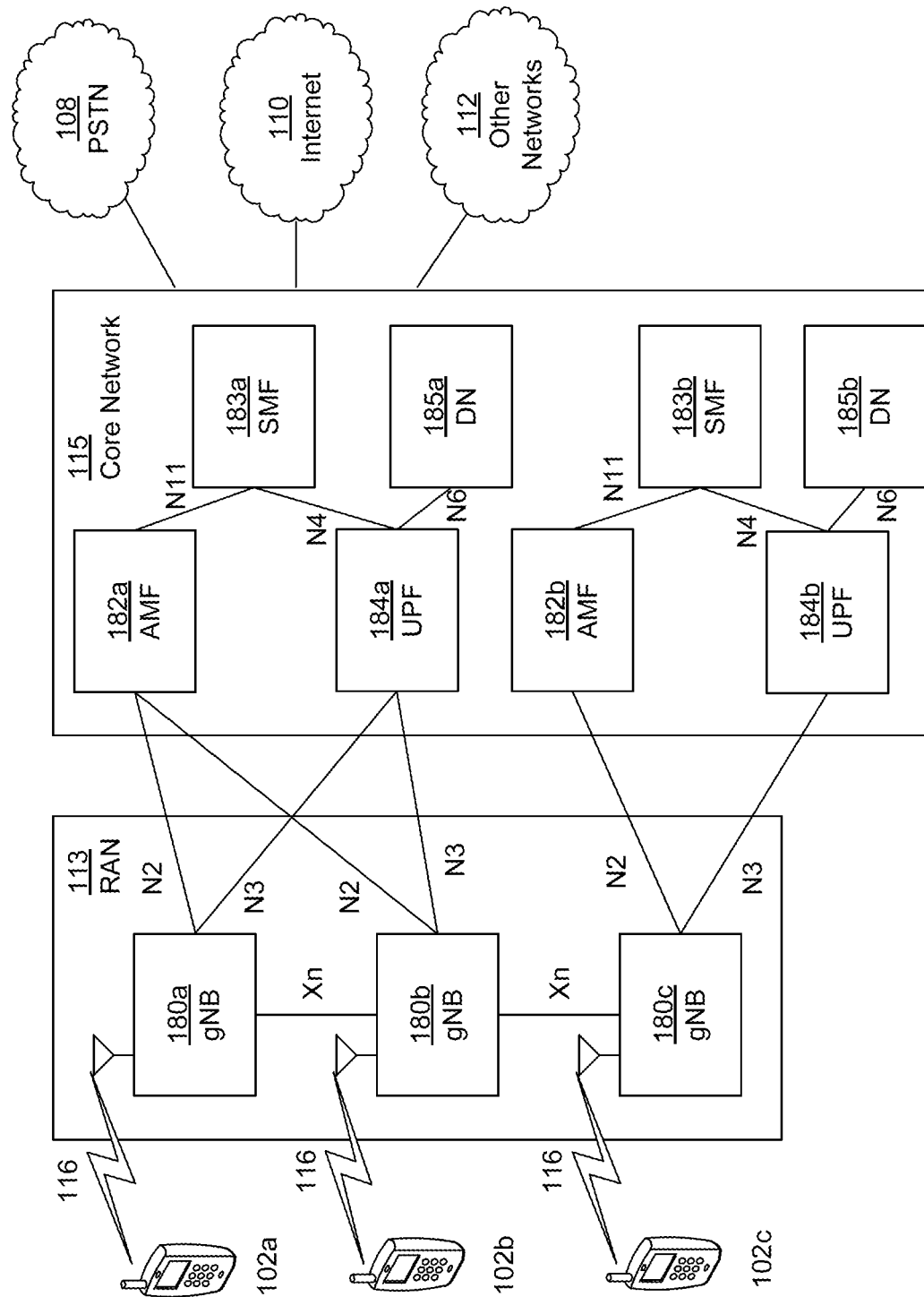
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

5G new radio (NR) may support millimeter-wave communications, e.g., compared to 4G Long Term Evolution (LTE) support for sub-6 GHz frequencies. Support for millimeter-wave communication may involve a beam-based (e.g., as opposed to cell-based) implementation for data and control transmission. A Physical Downlink Control Channel (PDCCH) may support an LTE downlink control channel. Enhanced PDCCH (EPDCCH) may support an LTE Advanced downlink control channel. EDPCCH may divide resources between data and control, e.g., using Frequency Division Multiplexing (FDM). Frequency tones assigned for EDPCCH may cover a whole subframe, for example, instead of three or four orthogonal frequency division multiplexing (OFDM) symbols. PDCCH and EPDCCH may not support multi-beam control and data transmission for 5G NR. Systems, methods, and instrumentalities for PDCCH transmission for cell based and multi-beam based architectures may be provided herein.

PDCCH transmission may be supported for cell-based and multi-beam-based architectures. 5G NR wireless systems may support a wide range of frequencies and WTRUs with different latency and reliability requirements, for example, using 5G beam-based downlink control channel. A cell-based system architecture (e.g., at lower frequencies) may broadcast a PDCCH to all WTRUs in a cell. A beam-based system architecture (e.g., at higher frequencies) may provide a beam-based PDCCH to WTRUs covered by the beam. Support may be provided for multi-beam transmission within a transmission/reception point (TRP) or between multiple TRPs while (e.g., simultaneously) supporting unified operation for frequency ranges.

A reference symbol may denote a symbol, such as a complex number that may be fixed and known, and may be used as a pilot. A reference signal may be used to denote a time domain signal that may be generated after processing reference symbols. In an example (e.g., for OFDM), reference symbols may be complex numbers that may be fed into an Inverse Discrete Fourier Transform (IDFT) block. A reference signal may be an output of the IDFT block. A resource element (RE) may be an OFDM symbol on a subcarrier. A resource element group (REG) may refer to a group of REs that may be used as building blocks of a control channel element (CCE), which may be used to assign resource elements to a user. A REG bundle may comprise REGs that may be adjacent in time or frequency, grouped together, and associated with the same precoder. NR-REG, NR-CCE, and NR-PDCCH may be used to refer to REG, CCE, and PDCCH for new radio (NR) in 5G. WTRU and user may be used interchangeably.

Control resource sets may be assigned for multi-beam control transmission. A control resource set may include several search spaces. A (e.g., each) search space may include several PDCCH candidates. A control resource set may be defined and/or configured in different ways for a DL control channel that may use beams. A CORESET configuration may be semi-static and may be done by using BCH or higher layer signaling (e.g., RRC). A CORESET configuration may include information such as the following (or any combination of them): the CORESET size and resources (e.g., time and frequency); type of REG bundling; transmission mode (e.g., distributed, localized, interleaving, and non-interleaving mapping of REG bundles); aggregation level set; DCI format size set; the number of PDCCH candidates that a WTRU monitors for each DCI format size and each aggregation level (the number can be zero for some combinations); quasi-co-located (QCL) assumptions; or whether the CORESET is single-beam or multi-beam.

Multiple single-beam CORESETS may be used to assign and/or configured. Multiple single-beam COREESTS may be assigned and/or configured using control resource sets associated with multiple beams.

Figure 2A:
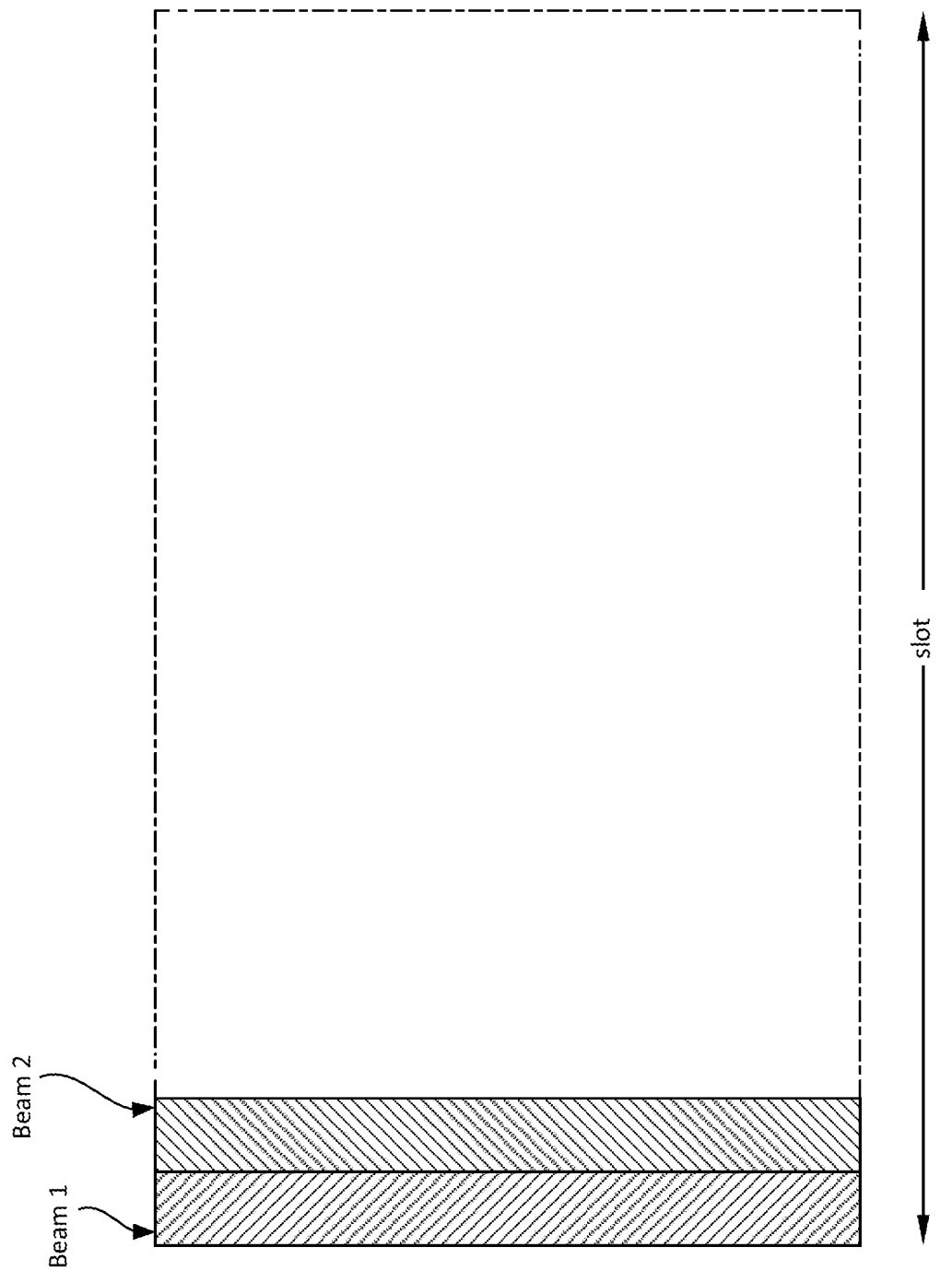
FIG. 2A is an example of a control resource set with PDCCH candidates that may be sent on beam 1 and/or beam 2.

FIG. 2A is an example of a control resource set with PDCCH candidates that may be sent on beam 1 and/or beam 2.

In an example, a control resource (CORESET) set may cover (e.g., all or a combination of OFDM symbols associated with multiple beams) OFDM symbols that may be assigned for downlink control. Different beams may be used on different OFDM symbols (e.g., as shown by example in FIG. 2A). In a resource set configuration, REG bundles may be configured as adjacent REGs in frequency. Mapping of REG bundles to CCEs may be in the frequency-first manner and may be done either with or without interleaving. QCL assumptions for an OFDM symbol of the control resource set may be included in the CORESET configuration. QCL assumptions may include (e.g., all) QCL parameters (including average gain, average delay, doppler shift, delay spread, doppler spread, spatial RX parameters) or a subset of them. A WTRU may receive a subset of QCL parameters, which may be common to (e.g., all) OFDM symbols, and may receive (e.g., additional multiple) subsets of the QCL parameters corresponding to multiple OFDM symbols included in the CORESET.

To configure a control resource set as multi-beam, a multi-beam property of the CORESET may be indicated (e.g., explicitly) during configuration (e.g., through PBCH or RRC). For example, the WTRU may assume that the control resource set is in a multi-beam mode of operation (e.g., if the WTRU receives multiple QCL assumptions corresponding to multiple OFDM symbols). The multi-beam property of the CORESET may be indicated (e.g., implicitly) based on the configured REG-to-CCE mapping for a CORESET spanning multiple OFDM symbols. For example, a WTRU may assume that the control resource set is in a multi-beam mode of operation (e.g., if the WTRU is configured with the frequency-first REG-to-CCE mapping (or frequency-first REG bundling). A WTRU may assume that the control resource set is in a single-beam mode of operation (e.g., the WTRU is configured with the time first REG-to-CCE mapping).

By default, no QCL may be assumed by a WTRU (e.g., a CORESET is configured as multi-beam and no QCL assumption is indicated in its configuration). A WTRU may assume that the same QCL assumptions as those for PBCH and/or sync signal are valid for the CORESET.

Figure 2B:
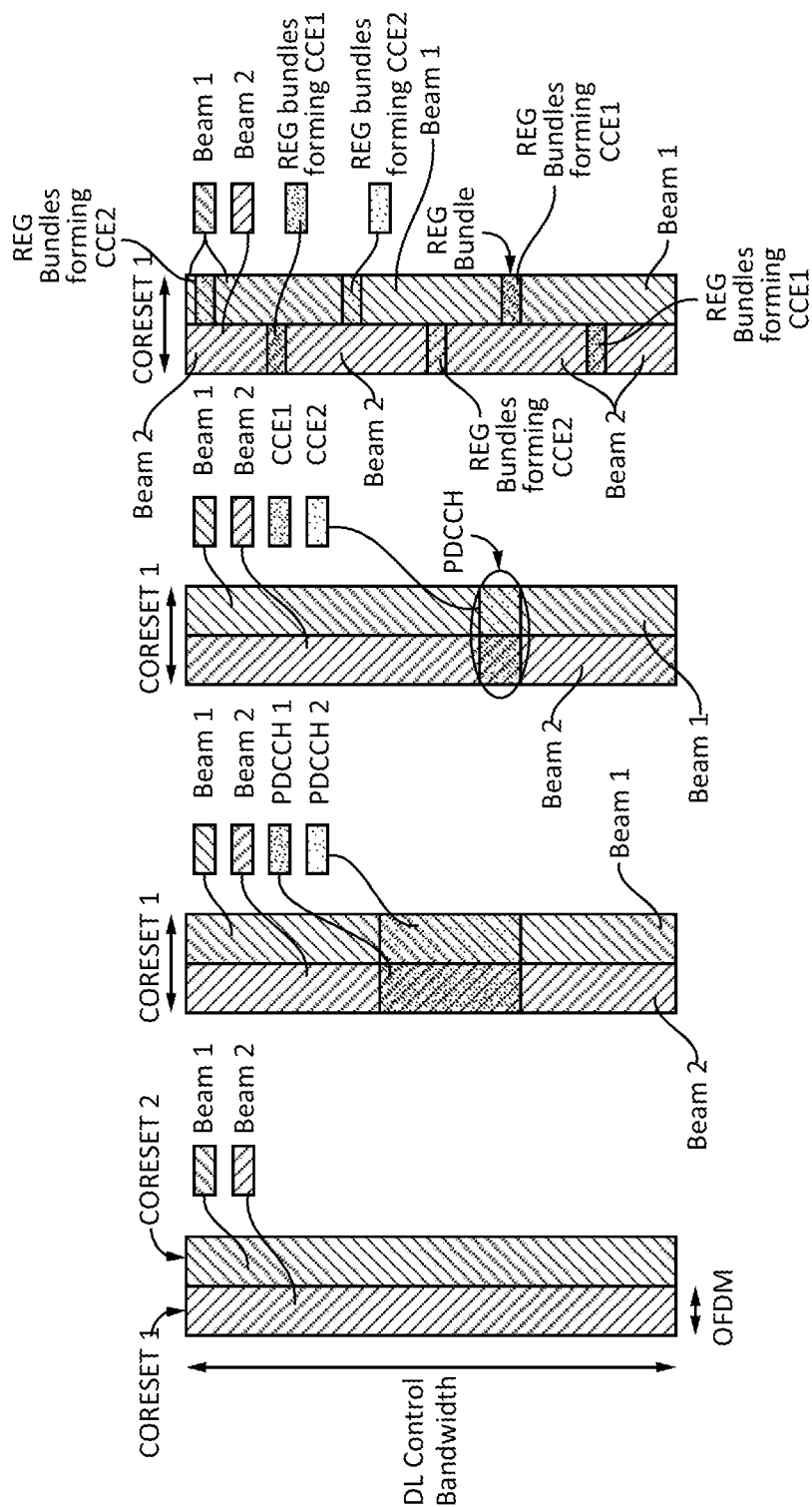
FIG. 2B are examples of CORSETs.

A search space may include PDCCH candidates on multiple OFDM symbols of a control resource set that may be sent over multiple beams. A (e.g., each) PDCCH candidate may be sent (e.g., only) over a (e.g., one) beam (e.g., on one OFDM symbol). Different PDCCH candidates of a search space may be on different OFDM symbols that may be sent over different beams. A (e.g., one) PDCCH candidate may include CCEs on different OFDM symbols that may be sent over different beams. CCEs may be configured over multiple (e.g., two) OFDM symbols and may be sent over two different beams. An example of a single-beam CORESET and three multi-beam CORESETS are shown in FIG. 2B. FIG. 2B from left to right shows: (i) single-beam CORESETs with each CORESET associated with a single beam; (ii) a multi-beam CORESET with each PDCCH transmitted on a single beam; (iii) a multi-beam CORESET with each CCE including a multi-beam PDDCH transmitted on a single beam; and (iv) a multi-beam CORESET with interleaved REG bundles that include a CCE transmitted on different beams.

Control resource sets may be associated with a (e.g., only one) beam (e.g., single beam CORESETs).

Figure 3:
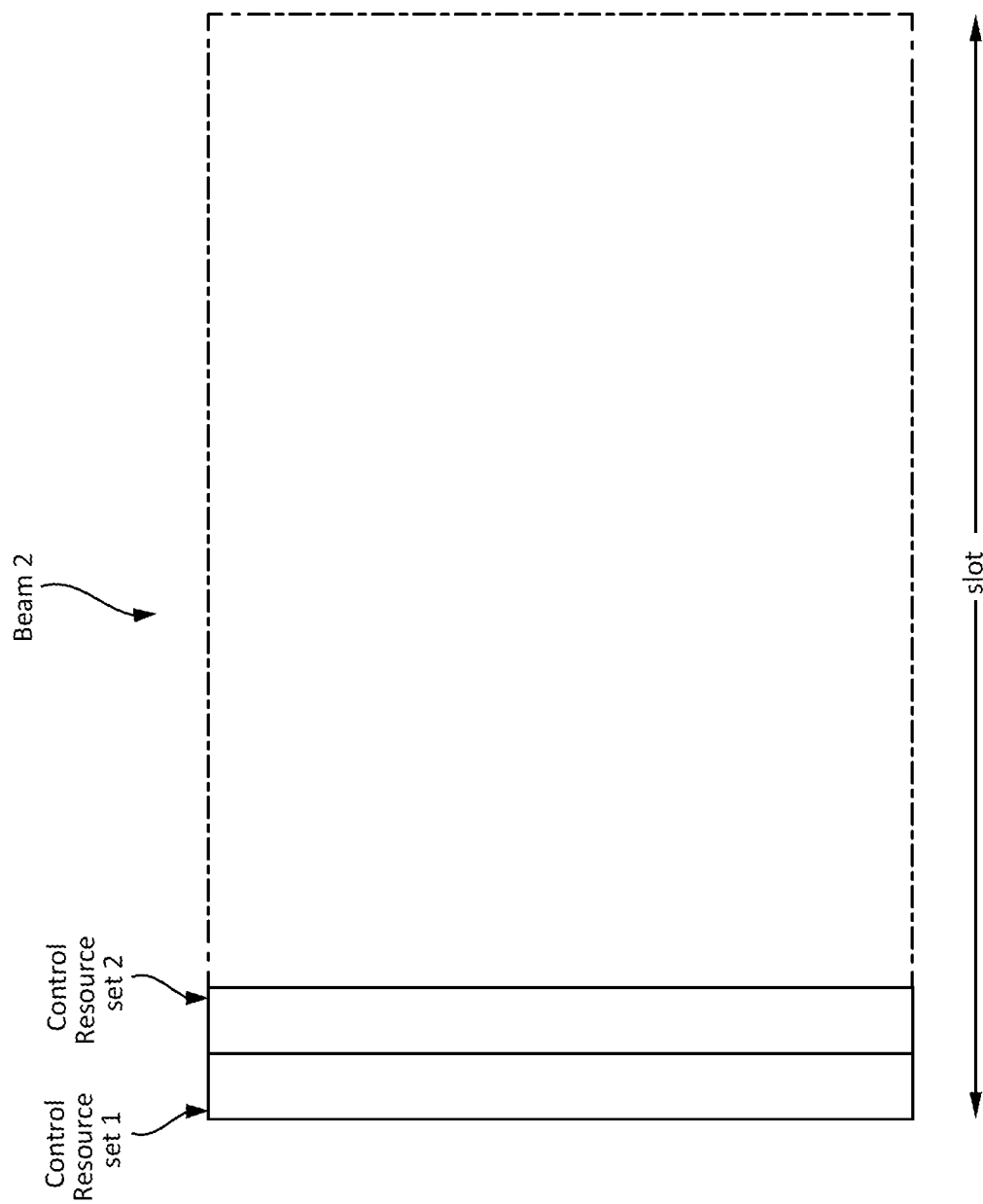
FIG. 3 is an example of different control resource sets that may be associated with different beams on different OFDM symbols.

FIG. 3 is an example of different control resource sets that may be associated with different beams on different OFDM symbols.

Different control resource sets may be associated with different beams on different OFDM symbols (e.g., as shown by example in FIG. 3). One or more (e.g., all) PDCCH candidates of a search space may be associated with a (e.g., only one) beam and a (e.g., one) OFDM symbol. One or more (e.g., all) candidates of a search space may be inside a (e.g., one) control resource set. An adjacent control resource set may have different or similar REG-to-CCE and CCE-to-candidate mappings. In an example, one control resource set may support localized PDCCH and the other control resource set may support distributed PDCCH. One or more (e.g., all) PDCCH candidates of a search space may be associated with a (e.g., only one) beam over one or more OFDM symbols, for example, when a beam may be transmitted over multiple OFDM symbols. A CORESET single-beam property may be included as part of the CORESET's configuration, which may provide (e.g., by implying) the QCL assumption for the whole CORESET. Indication of time-first REG bundling (e.g., or time-first REG-to-CCE mapping) in the configuration of the CORESET may provide (e.g., implicitly provide) the single-beam property of the CORESET and/or the QCL assumption for the whole CORESET. Single-beam may be used by default and the single beam REG-to-CCE mapping may be frequency-first (e.g., in the case that a control resource set spans only one OFDM symbol).

A multi-beam CORESET with a (e.g., each) PDCCH transmitted on a single beam may be used. A CORESET may span multiple OFDM symbols that are associated with multiple beams (e.g., each associated with one or more OFDM symbol). A PDCCH candidate inside this CORESET may be on one OFDM symbol and transmitted by one beam. A WTRU may use one QCL assumption for PDCCH detection (e.g., which may be associated with the OFDM symbol that the PDCCH is mapped to). Different PDCCH candidates of a WTRU-specific search space (including the potential PDCCH candidates for the WTRU) may be associated with different beams. PDCCH candidates (e.g., all candidates) of a search space may be associated with a single beam. A search space may be (e.g., dynamically) restricted to a subset of PDCCH candidates on one beam, based on (e.g., dynamic) signaling through group-common PDCCH (e.g., in the case that a WTRU-specific search space is associated with multiple beams).

A multi-beam CORESET with (e.g., each) CCE transmitted on a single beam may be used. For a multi-beam CORESET, one PDCCH candidate may include two or more CCEs on different OFDM symbols (e.g., where each CCE could potentially be transmitted on a different beam). A CCE may be entirely mapped on one OFDM symbol and transmitted by a single beam. A WTRU may use multiple sets of QCL assumptions for PDCCH detection with (e.g., each) CCE associated with the QCL assumption of the corresponding OFDM symbol that it is mapped to.

A multi-Beam CORESET with interleaved REG bundles including a CCE may be transmitted on different beams. A (e.g., each) REG bundle may be (e.g., entirely) located on one OFDM symbol and transmitted by a single beam. In the case of interleaving of REG bundles across different OFDM symbol of the CORESET, one CCE may include REG bundles on different OFDM symbols, transmitted by different beams. The WTRU may include multiple sets of QCL assumptions for PDCCH detection with each REG bundle being associated with the QCL assumption of the corresponding OFDM symbol that it is mapped to.

REG bundling may follow a frequency-first mapping (e.g., for multi-beam CORESET with each PDCCH transmitted on a single beam; multi-beam CORESET with each CCE including a multi-beam PDCCH transmitted on a single-beam; and multi-beam CORESET with interleaved REG bundles including a CCE transmitted on a single beam). A WTRU may assume the block of complex-valued symbols (e.g., $d(0), \ldots, d(M_{symb}-1)$) are mapped to resource elements (k l) on antenna port (p) in increasing order of first k, then, l in the control-channel elements within an OFDM symbol used for a given PDCCH (e.g., where k is the frequency index and l is the OFDM symbol index within a subframe).

A (e.g., one) PDCCH may be transmitted with multiple beams. Different beams may be used on available OFDM symbols of a control resource set, for example, when a control resource set may be (e.g., is) defined over multiple OFDM symbols. PDCCH candidates may be formed and sent over multiple OFDM symbols, for example, using different beams. Beams may be transmitted, for example, by one or more TRPs (e.g., the same TRP or multiple TRPs). Transmitting a (e.g., one) PDCCH on different beams may provide beam diversity and may (e.g., drastically) reduce a probability of shadowing and beam blocking.

Figure 4:
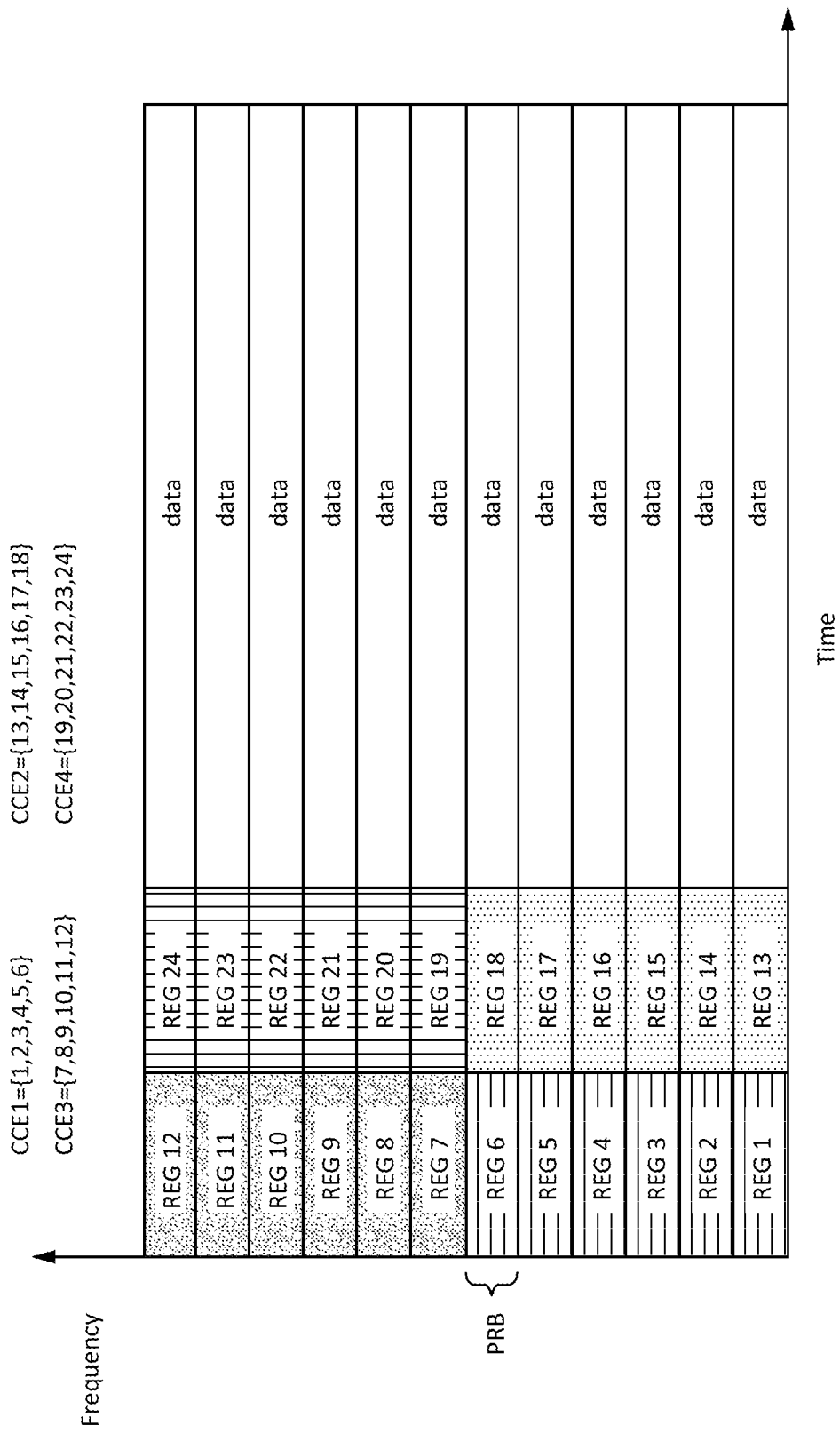
FIG. 4 is an example of four CCEs on two OFDM symbols assigned to a PDCCH candidate.

FIG. 4 is an example of four CCEs on two OFDM symbols assigned to a PDCCH candidate. First and second OFDM symbols may be sent over two different beams. A PDCCH may be sent over multiple beams, for example, by dividing its CCEs among the multiple beams. In an example (e.g., as shown in FIG. 4), a PDCCH with an aggregation level (AL) of four may have two CCEs on a first OFDM symbol (e.g., sent over a first beam) and two CCEs over a second OFDM symbol (e.g., sent over a second beam). Symbols transmitted over the CCEs of a PDCCH may be, for example, repetitions of each other (e.g., sent using different precoding) or may be, for example, obtained by modulating the output bits of a common forward error correcting code (FEC) whose input bits may be downlink control information (DCI).

Figure 5:
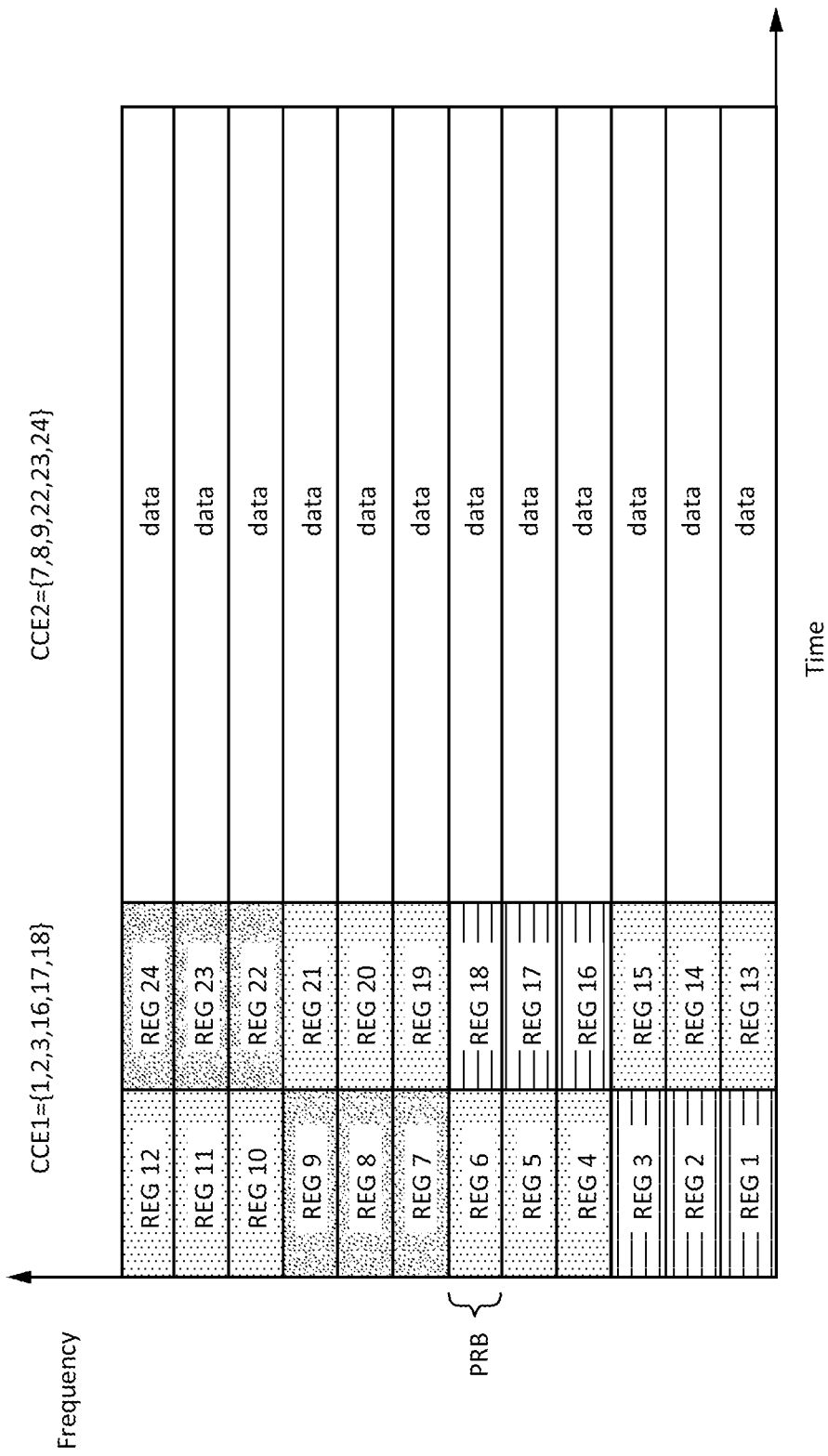
FIG. 5 is an example of distributing CCEs over multiple/different beams (e.g., on first and second OFDM symbols).

FIG. 5 is an example of distributing CCEs over multiple/different beams (e.g. on first and second OFDM symbols). In an example, a PDCCH may be sent over multiple beams, for example, by sending a (e.g., each) CCE over multiple beams. In an example, a CCE of size 6 may have 3 REGs on a first symbol (e.g., sent over a first beam) and 3 REGs over a second OFDM symbol (e.g. sent over a second beam). Multiple (e.g., two) CCEs may each consist of multiple (e.g., two) REG bundles of size 3 (e.g., sent over multiple (two) different beams). This procedure may be useful, for example, to add beam diversity to frequency diversity (e.g., for distributed PDCCH).

CCEs may be mapped for multi-beam transmission. CCEs may be mapped to PDCCH candidates, for example, by time-first mapping and/or frequency-first mapping. In an example of frequency-first mapping, consecutive CCEs in frequency (e.g., on the same OFDM symbol) may be assigned to a PDCCH candidate. In an example of time-first mapping, adjacent CCEs in time may be assigned to a PDCCH candidate. Remaining CCEs of a PDCCH candidate may be in another PRB, for example, when an aggregation level may be larger than a time length of a control resource set.

In an example, a frequency-first CCE-to-candidate mapping may be used, for example, when a control resource set may cover an (e.g., only one) OFDM symbol.

In an example, time-first or frequency-first, CCE-to-candidate mappings may be used, for example, when a control resource may cover multiple OFDM symbols.

FIG. 4 is an example of time-first CCE-to candidate mapping.

Figure 6:
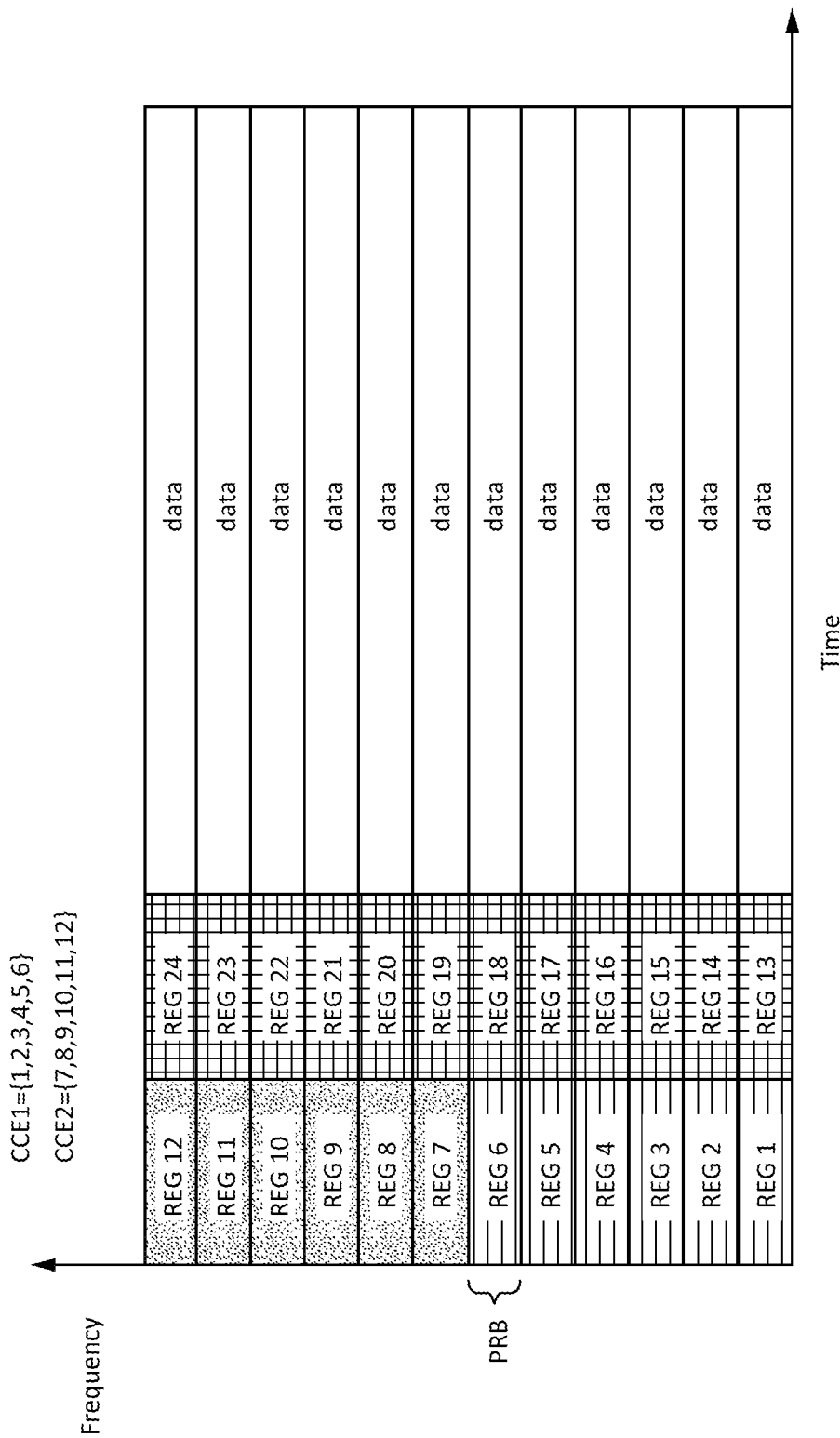
FIG. 6 is an example of frequency-first CCE-to candidate mapping for PDCCH.

FIG. 6 is an example of frequency-first CCE-to candidate mapping for PDCCH. Frequency-first CCE-to candidate mapping may be used, for example, when a (e.g., each) PDCCH may be sent over a (e.g., one) beam.

Figure 7:
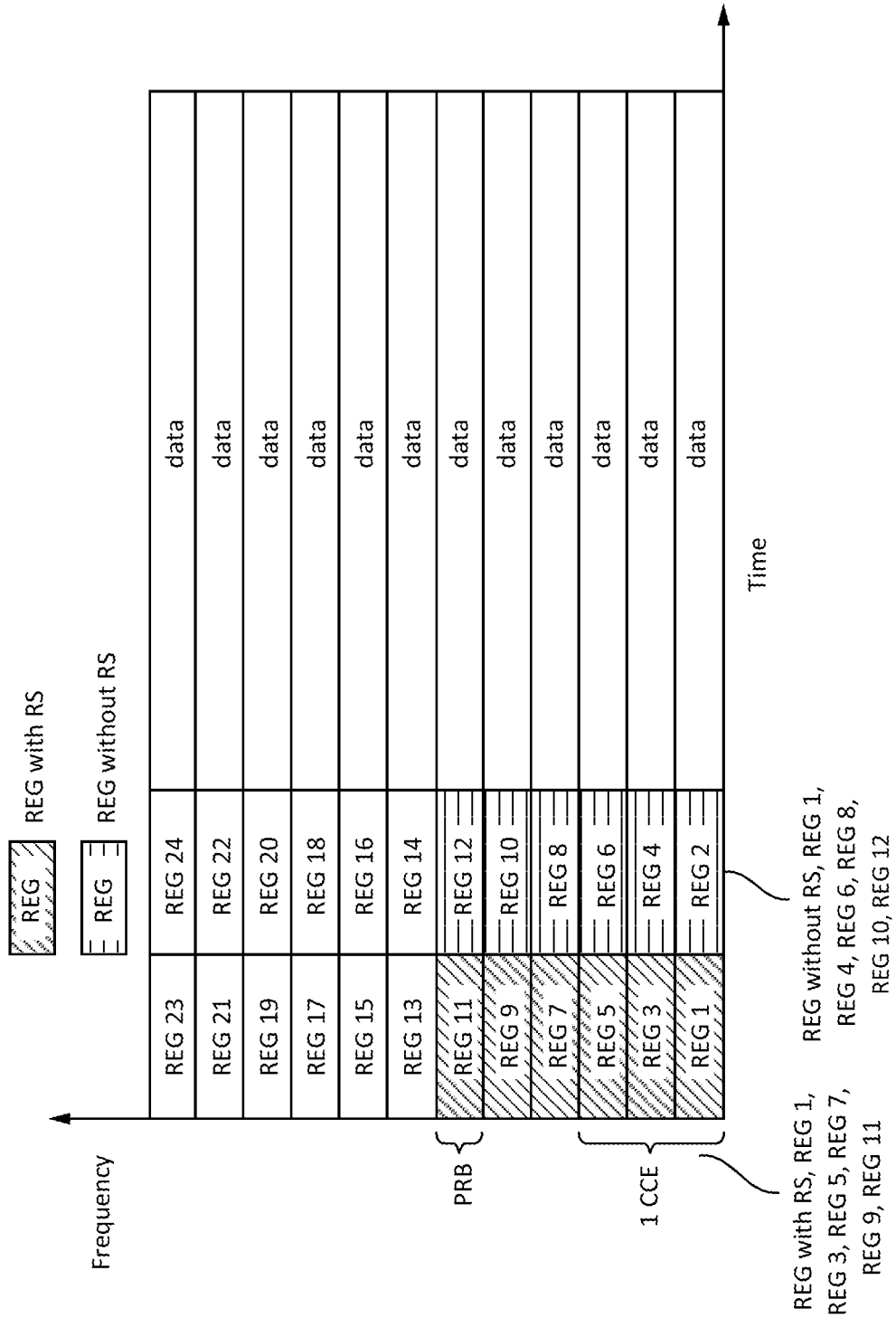
FIG. 7 is an example of time-first REG-to-CCE mapping when (e.g., all) OFDM symbols of a control region may be associated with a (e.g., one) beam and a (e.g., one) control resource set.

Time-first and frequency-first mapping may be used, for example, to map REGs to CCEs. In an example, time-first REG-to-CCE mapping for beam-based PDCCH transmission may be useful, for example, when (e.g., all) OFDM symbols of a control region may be associated with a (e.g., single) beam. A time-first REG-to-CCE mapping may be used (e.g., in this case). REGs on the same PRB (e.g., adjacent in time) may be bundled together, for example, to improve channel estimation through RS aggregation. In an example, one or more REGs may use a DMRS in adjacent REGs for channel estimation. FIG. 7 presents an example of this.

FIG. 7 is an example of time-first REG-to-CCE mapping when (e.g., all) OFDM symbols of a control region may be associated with a (e.g., one) beam and a (e.g., one) control resource set.

Figure 8:
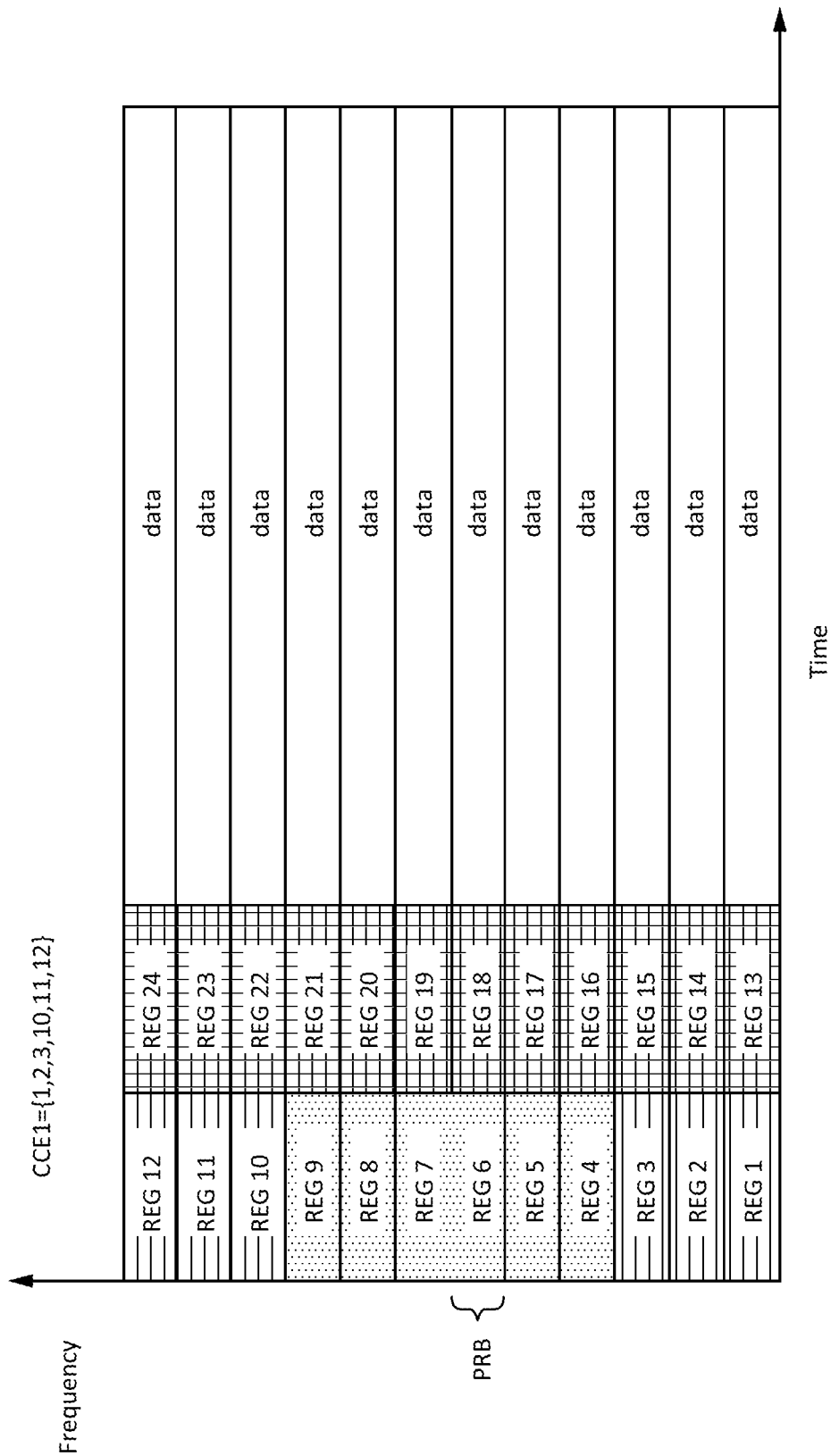
FIG. 8 is an example of distributed frequency-first mapping of REGs to CCEs.

In an example, a (e.g., each) OFDM symbol may be associated with a separate beam. REGs may be mapped to CCEs, for example, by using a frequency-first mapping. REG bundling may (e.g., also) be performed in frequency. FIG. 8 presents an example of distributed frequency-first mapping of REGs to CCEs.

FIG. 8 is an example of distributed frequency-first mapping of REGs to CCEs. In an example, REG bundling size may be 3. First and second OFDM symbols may be associated with multiple (e.g., two) different beams.

Figure 8A:
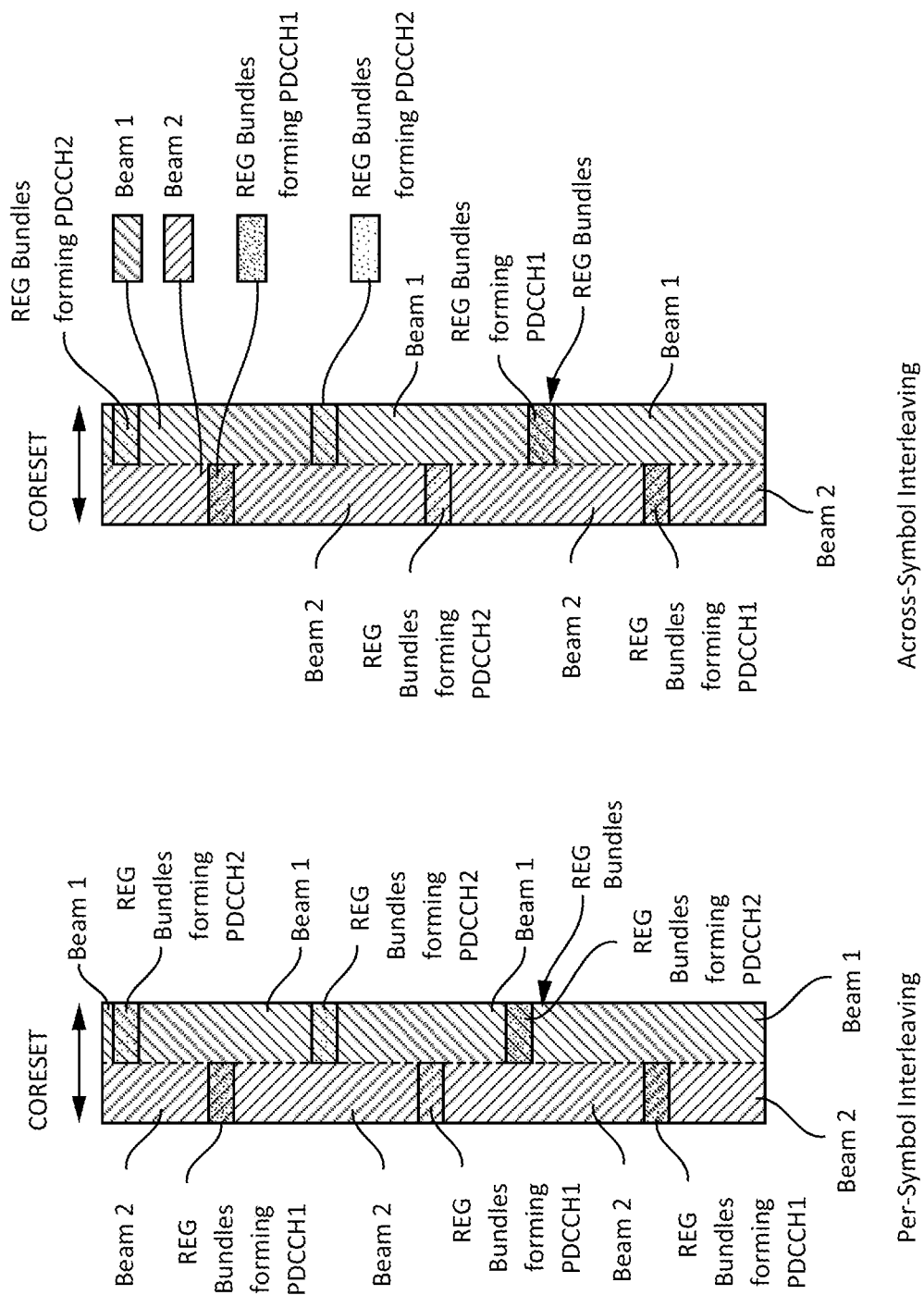
FIG. 8A shows examples of interleaving of frequency-first REG bundles in a multi-symbol CORESET using per-symbol interleaving and across-symbol interleaving.

Per-symbol interleaving and across-symbol interleaving may be used. FIG. 8A is an example of interleaving of frequency-first REG bundles in a multi-symbol CORESET using per-symbol interleaving (e.g., left side of FIG. 8A) and across-symbol interleaving (e.g., right side of FIG. 8A).

Frequency-first REG bundling may be used in a multi-symbol CORESET. Interleaving of REG bundles inside the CORESET can be done in different ways. The REG bundles may be interleaved on each symbol separately (e.g., as shown in the left side of FIG. 8A) (e.g., per-symbol interleaving). For example, l.k REG bundles of the CORESET may be partitioned to l subsets corresponding to l OFDM symbol of the CORESET, each containing k REG bundles. REG bundles in each subset may be interleaved by an interleaver (e.g., with design parameters that may be predefined by specification or configured by RRC). Consecutively interleaved REG bundles (e.g., REG bundles that are consecutive in their interleaved indices) may be assigned to CCEs. Consecutive CCEs may be assigned to PDCCH candidates. A CCE may be on one OFDM symbol (e.g., corresponding to one beam). A PDCCH candidate may be on one OFDM symbol (e.g., corresponding to one beam). The design parameters of the interleavers on different symbols may be the same or different.

The REG bundles may be interleaved across symbols (e.g., as shown in FIG. 8A, on the right-hand side). In such a case (e.g., which may be referred to as cross-symbol or across-symbol interleaving), l.k REG bundles of the CORESET (e.g., with k REG bundle on each of the l OFDM symbols of the CORESET) may be interleaved by an interleaver (e.g., with design parameters that may be predefined by specification or configured by RRC). Consecutively interleaved REG bundles (e.g., REG bundles that are consecutive in their interleaved indices) may be assigned to CCEs. Consecutive CCEs may be assigned to PDCCH candidates. A CCE can be on multiple OFDM symbols (e.g., corresponding to multiple beams). A PDCCH candidate can be on multiple OFDM symbols (e.g., corresponding to multiple beams). This may provide multi-beam diversity for PDCCH transmission. The estimate of the content of each REG bundle may be obtained based on its corresponding beam and/or its corresponding QCL assumptions (e.g., to realize the multi-beam diversity in reception of PDCCH). The multi-beam PDCCH detection may be determined by combining soft detected contents of REG bundles on different beams, e.g., to achieve beam diversity.

The interleaving mode (e.g., inter-symbol or cross-symbol interleaving) may be predefined in specifications or included in the CORESET configuration. For example, one bit in the CORESET configuration, e.g., by RRC may indicate whether the interleaving is per-symbol or cross-symbol. In examples, an indication of the interleaving mode may be mixed with other parameter configurations of the CORESET. For example, 3 bits in CORESET configuration may indicate the choice among cases including at least the following: (i) time-first bundling without interleaving; (ii) time-first bundling with interleaving with REG bundle size equal to the length of CORESET; (iii) time-first bundling with interleaving with REG bundle size equal to the size of CCE; (iv) frequency-first bundling without interleaving; (v) frequency-first bundling with per-symbol interleaving; and/ or (vi) frequency-first bundling with cross-symbol interleaving.

Per-symbol interleaving may have a reduction of effective search space. A (e.g., each) PDCCH candidate may be entirely on one OFDM symbol (e.g., for frequency-first REG bundling with per-symbol interleaving in a multi-symbol CORESET). The PDCCH candidates of a set of a search space (e.g., or a set of search spaces) corresponding to a WTRU may be partitioned to multiple parts (e.g., each corresponding to one OFDM symbol of the CORESET and including the PDCCH candidates on that corresponding OFDM symbol). The effective search space (e.g., or effective set of search spaces) of the WTRU may be restricted to one of those parts (e.g., only one of those parts). The WTRU may perform blind decoding of PDCCH (e.g., only) for candidates on a specific OFDM symbol inside the CORESET (e.g., or a subset of OFDM symbols inside the CORESET). The choice of the OFDM symbol of the CORESET for limiting the effective search space of a WTRU may be based on the proximity of the corresponding beam to the beam that is used by WTRU for other purposes (e.g., PDSCH). The WTRU may know its corresponding OFDM symbol (e.g., for the limited effective search space) through signaling from a gNodeB (e.g., explicit information from gNodeB through group-common PDCCH through configuration) or without additional signaling from gNodeB. For example, the WTRU may identify its corresponding OFDM symbol (e.g., for the limited effective search space) without signaling from gNodeB, by using information the WTRU gathers from beam tracking and/or its corresponding beams for PDSCH.

For implicit identification of the WTRU's corresponding symbol in the CORESET by the WTRU, the WTRU may compare beams corresponding to the symbols of the CORESET with the beam or beams that the WTRU tracks from the SS/PBCH block, where SS refers to the synchronization signals. The WTRU may implicitly identify its corresponding symbol of the CORESET (e.g., if the beam associated to the symbol coincides to the beam, or one of the beams, associated to the WTRU, or if the beam associated with the symbol is closer to the beam or beams associated with the WTRU, among the beams associated with the CORESET).

The identification of the corresponding symbol of the CORESET may be determined by the WTRU by comparing the beam associated with each symbol of the CORESET to a WTRU-specific set of beams that is configured by RRC or other higher layer signaling for the WTRU.

For comparing the beams associated to symbols of the CORESET with the beams or the set of beams associate to a WTRU, the WTRU may use channel estimation information from the DMRS. The metric for the comparison of the beams associated to symbols of the CORESET with the beams or the set of beams associated to a WTRU may be based on maximizing the channel correlation.

A downlink control indicator (DCI) may be provided for multi-dimensional transmission with primary and secondary dimensions. Additional transmission dimensions, such as beams, beam-pair links, panels, and TRPs, may be defined in NR. In an example, an (e.g., a single) NR-PDSCH may be assigned per dimension (e.g., for a multiple NR-PDSCH transmission scenario). In an (e.g., alternative) example, an (e.g., a single) NR-PDSCH may be jointly transmitted over multiple dimensions (e.g., with diversity transmission).

An NR-PDCCH may be transmitted per dimension, for example, to send control information for transmission on the dimensions. A system may (e.g., alternatively) send an (e.g., one) NR-PDCCH, for example, to enable cross-dimensional scheduling and to send cross dimensional control information.

A WTRU may monitor search spaces for a (e.g., each) dimension, for example, for use of per-dimensional NR-PDCCH.

In an example, an NR-PDCCH for a (e.g., each) dimension may, for example, be assigned independent (e.g., non-restricted) search spaces. This may increase the complexity of a blind decoding procedure for a WTRU and may provide the most flexibility for resource assignment.

In an example, an NR-PDCCH for a (e.g., each) dimension may, for example, be assigned a restricted search space that may depend on search spaces of one or more other dimensions. Restrictions may limit the size of a (e.g., an assigned) search space.

In an example, a WTRU may monitor search spaces in a (e.g., one) dimension, for example, when a (e.g., single) NR-PDCCH may be used for cross-dimensional control channel information transmission.

In an example, a (e.g., single) dimension may be designated as a primary dimension. An NR-PDCCH may be sent on a primary dimension and may assign resources on (e.g., all) other (e.g., secondary) dimensions. Selection of a primary dimension may, for example, depend on a dimension that may cover the WTRUs most reliable dimensions and/or dimensions that may be available at a specific time.

In an example in beam-based transmission, a primary beam pair may be based on a wide beam at a TRP that may cover a set of narrow beams and a corresponding receive beam at WTRUs. One or more secondary beam(s) may be a set of narrow beams.

Figure 9:
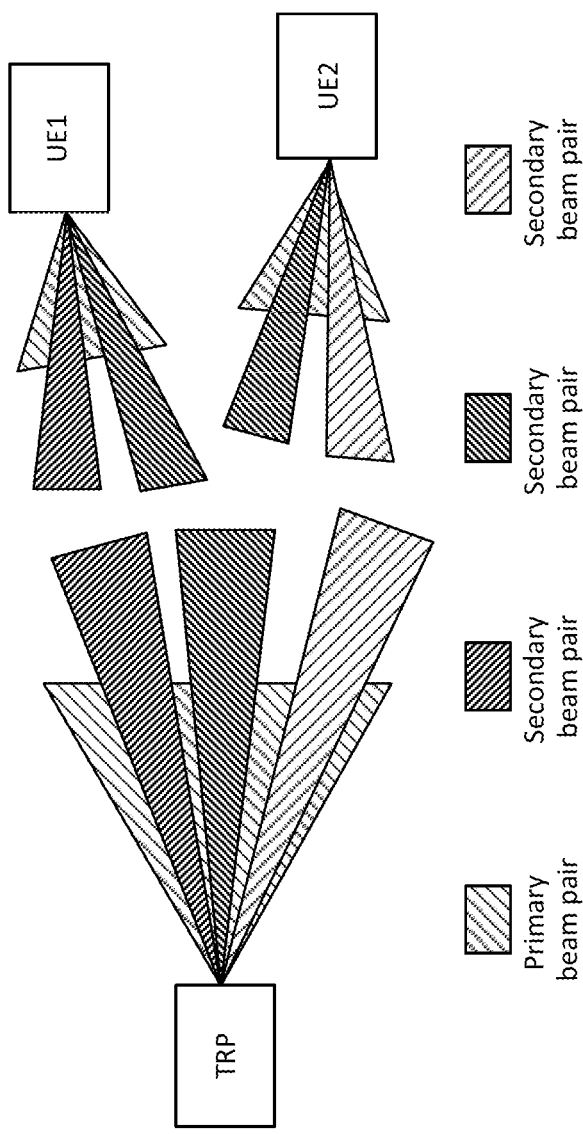
FIG. 9 is an example of cross beam scheduling.

FIG. 9 is an example of cross beam scheduling. A DCI in an NR-PDCCH may include an index of a (e.g., specific) dimension that a WTRU may (e.g., should) use for a time duration of a resource. In an example, NR-PDCCH may occupy the first two symbols of a slot. A WTRU may (e.g., for the first two symbols) switch its beam to a primary beam (e.g., NR-PDCCH beam) and may (e.g., upon reading an NR-DCI) switch its beam to an indicated or desired receive/ transmit beam for other (e.g., the last five) symbols of a slot.

Figure 10:
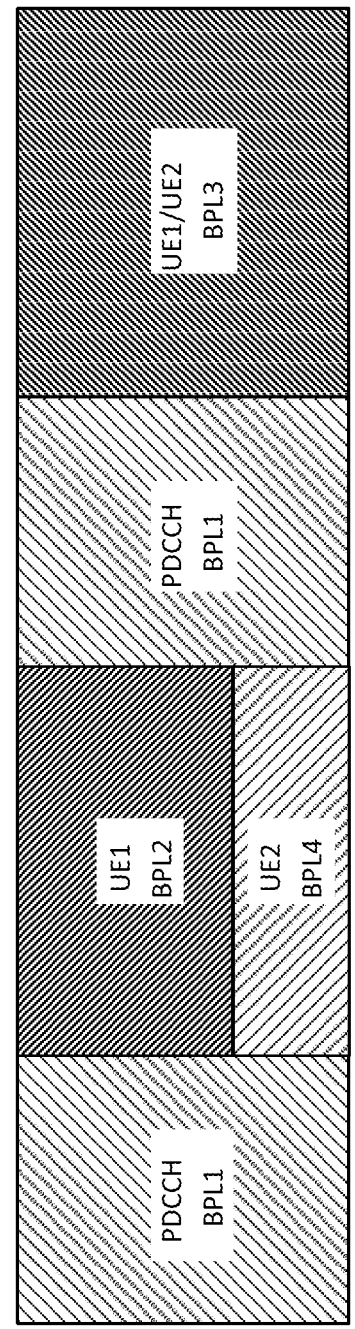
FIG. 10 is an example of a frame structure with cross beam scheduling.

FIG. 10 is an example of a frame structure with cross beam scheduling.

In an example, a gNB and WTRUs (e.g., UEs) may (e.g., in slot 1) switch to primary beam pair links (BPLs), e.g., BPL1.

A gNB and WTRUs may (e.g., for the first N OFDM symbols) stay in an antenna configuration and decode a primary PDCCH, where N may be configurable.

A PDCCH DCI may inform WTRU1 and WTRU2 about resources that may be used in a time domain and a frequency domain.

A PDCCH DCI may inform WTRU1 and WTRU2 about a BPL that they may (e.g., must) use in resources (e.g., BPL2 and BPL4).

WTRUs may switch to resources and antenna configurations (e.g., there may be a gap period between PDCCH and PDSCH to allow for the switch).

WTRUs may decode their PDSCHs for a remainder of a slot.

A gNB and WTRUs may (e.g., in slot 2) switch back to primary beam pair links (e.g., BPL1).

A gNB and WTRUs may (e.g., for the first N OFDM symbols) stay in an antenna configuration and decode a primary PDCCH, where N may be configurable and may be different from resources used in slot 1.

A PDCCH DCI may inform WTRU1 and WTRU2 about resources that may be used in a time domain and a frequency domain and an antenna configuration. Resources may span a (e.g., an entire) frequency domain. WTRUs may switch to a downlink MU-MIMO mode.

WTRUs may switch resources and antenna configurations (e.g., there may be a gap period between PDCCH and PDSCH to allow for the switch).

WTRUs may decode their PDSCHs for the rest of a slot.

A PDCCH (e.g., for primary beams) may (e.g., always) be present. Secondary beams may not contain a PDCCH in connected mode. A secondary beam PDCCH may be sent at different periodicity for beam management.

Primary beams may be sent from the same or different TRPs, panels, etc.

In an example, a (e.g., the same) NR-PDCCH may be sent on one or more (e.g., all) dimensions (e.g., for redundancy).

Cross dimensional scheduling may be enabled, for example, by defining an indicator for a (e.g., each) dimension, e.g., to enable a WTRU to identify a dimension. A dimension may be global (e.g., unique over all WTRUs) or may be WTRU specific. This may enable a primary cell to indicate a dimension for specific control information.

A flag may be provided, for example, to inform a WTRU whether control information may be derived from a primary dimension or may be derived independently.

DCI information may be structured, for example, to enable an independent DCI for a (e.g., each) dimension (e.g., [DCIx, dimension]).

DCI information may be structured, for example, to enable a dependent DCI for a subset of dimensions (e.g., [DCIx, dimension1, . . . , dimension n]).

This framework (e.g., architecture, configuration, and/or procedures) may permit cross-beam scheduling, cross-panel scheduling and cross TRP scheduling.

A search space may provide multi-beam, multi-TRP transmission. Multi-TRP as used herein may include multi-beam (panel).

Figure 12:
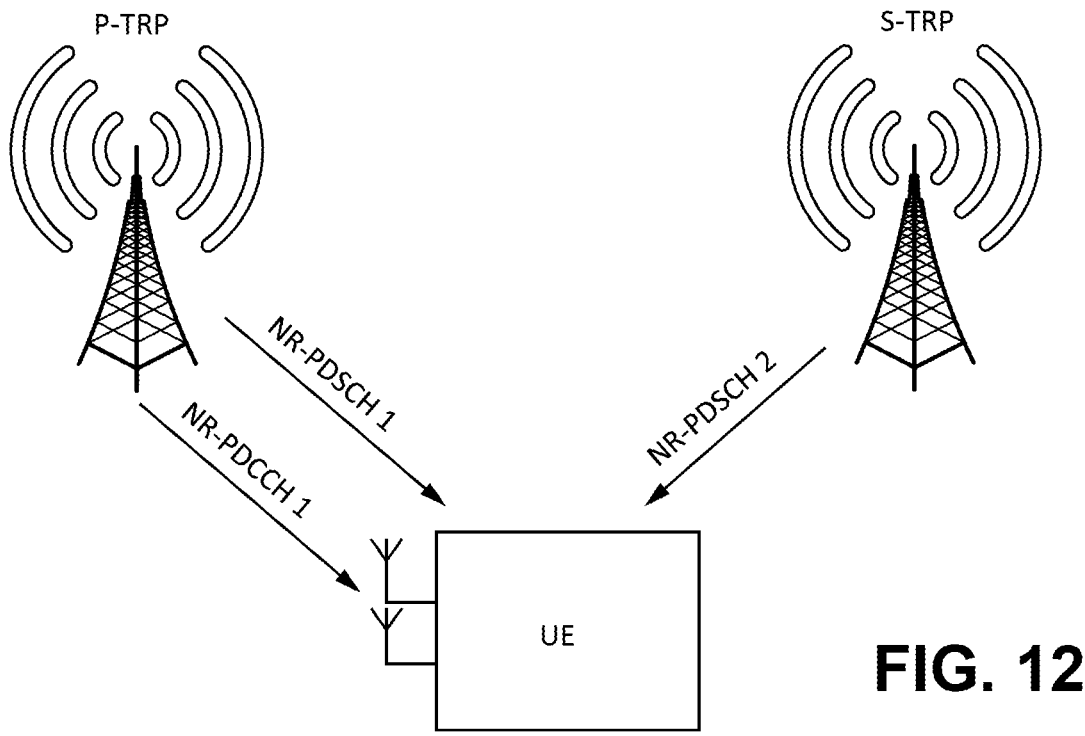
FIG. 12 is an example of cross TRP scheduling with two TRPs.

In a multi-TRP transmission system, as shown for example in FIG. 12, a (e.g., each) TRP may transmit a (e.g., different) NR-PDSCH transmission. However, the scheduling of (e.g., different) NR-PDSCH may be done by a single PDCCH (e.g., through cross-TRP scheduling). A gNB may schedule a downlink transmission by at least one of the TRPs by transmitting the NR-PDCCH from a (e.g., the main) TRP.

The cross TRP scheduling may be implemented by adding a TRP indicator field (TIF) to each DCI format to indicate the related information to the NR-PDSCH transmission.

A TIF may include bits that represent the index of the TRP to which the PDSCH scheduling corresponds. The primary TRP may send multiple DCIs each with a different TIF to indicate multiple scheduling information corresponding to multiple NR-PDSCH payloads. A TIF may include bits that represent the overall number of TRPs that participate in the transmission. A TIF may be a single bit that indicates the presence of cross-TRP scheduling.

The cross TRP scheduling can be activated/de-activated dynamically by monitoring the presence of a TIF in a DCI.

A gNB can either enable or disable the cross-TRP scheduling independently with a higher layer, e.g., RRC or similar signaling.

A WTRU may determine the starting symbol of the NR-PDSCH of each TRP dynamically (e.g., from a starting symbol field (SSF)). A WTRU may be configured with a starting symbol field for each TRP.

A common search space may be transmitted by a TRO (e.g., the primary TRP). The WTRU-specific search spaces may be transmitted by the TRPs (e.g., all the configured TRPs).

A WTRU may monitor the common search space on the primary TRP signal (e.g., to determine if it is configured for multi-TRP transmission, for example, if a TIF is present). If a WTRU determines that it is configured for multi-TRP transmission, then the WTRU may monitor (e.g., all) the WTRU specific search spaces of the configured TRPs. For example, the WTRU may look for DCIs whose CRC are scrambled with an RNTI. The RNTI may be the C-RNTI of the primary TRP that indicates the association of the WTRU content to the common control DCI or it may be a TRP-specific RNTI.

A WTRU may have one or more search spaces. A monitoring and detection procedure may comprise blind decoding. A (e.g., each) WTRU-specific search space may include a number of potential PDCCH candidates that the WTRU may monitor, for example, to find and detect its assigned PDCCH. A (e.g., one) search space may belong (e.g., completely) to a control resource set. Different search spaces in different control resource sets may be assigned to a WTRU. In an example, a total number of blind decodings for a WTRU (e.g., a total number of PDCCH candidates in search spaces corresponding to the WTRU) may be limited, for example, by a fixed number, which may be independent of a number of search spaces and control resource sets. In an (e.g., alternative) example, there may be a (e.g., fixed or configured) maximum number of blind decodings per control resource set and/or per beam.

Cross panel scheduling may be provided. An NR TRP may be equipped with multiple panels. A TRP may transmit (e.g., simultaneously) multiple NR-PDSCHs to a WTRU and it may allocate a (e.g., one) NR-PDSCH per panel. A (e.g., each) panel may have, for example, its own control resources with its own DCI that may contain scheduling assignments. A TRP may, for example, send DCIs for multiple panels on a (e.g., single) NR-PDCCH from a primary TRP (e.g., compared to sending an NR-PDCCH per panel).

Figure 11:
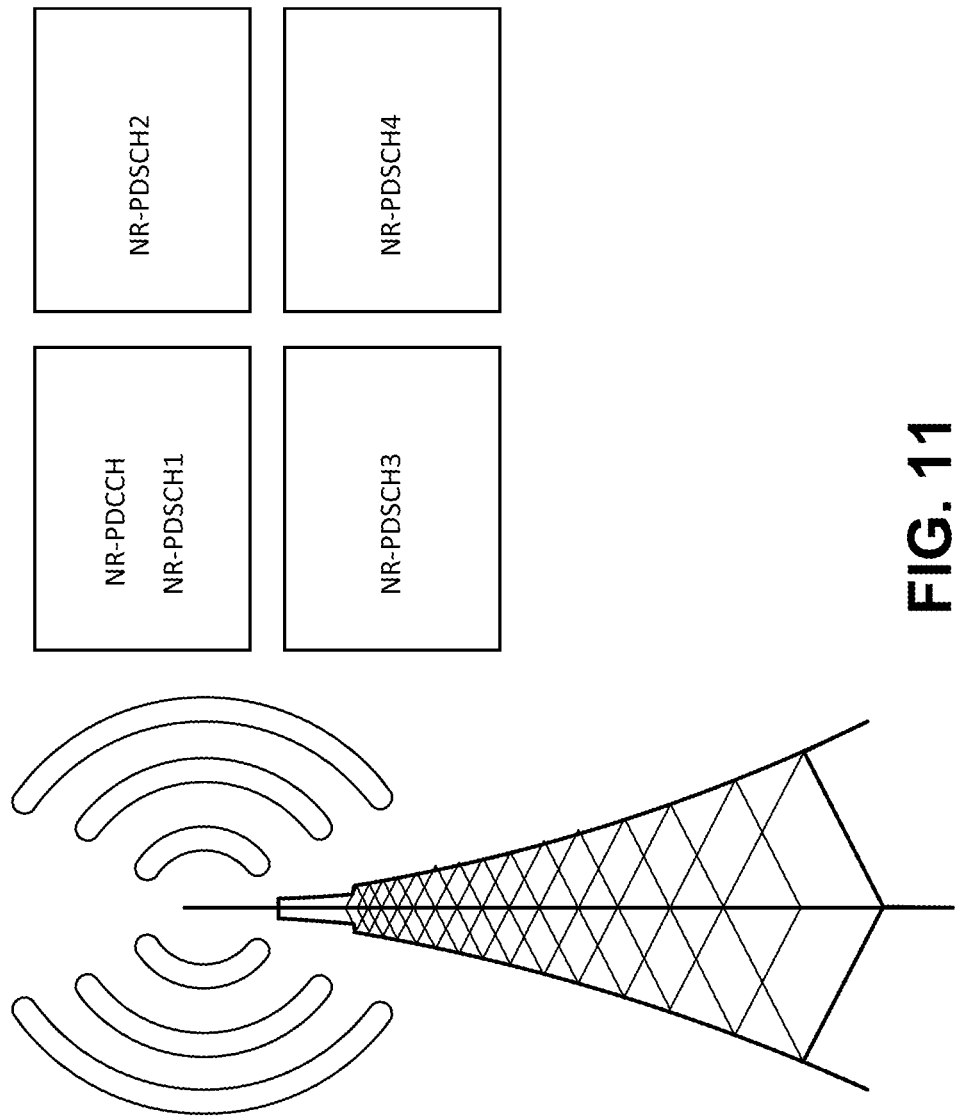
FIG. 11 is an example of cross-panel scheduling with four panels.

FIG. 11 is an example of cross-panel scheduling with four panels. In an example, a TRP with four panels may send four NR-PDSCHs to a WTRU with a (e.g., only one) NR-PDCCH on the first panel. A resource assignment for a (e.g., each) NR-PDSCH may, for example, be independent. A resource assignment may be placed in an NR-PDCCH without overlapping with each other. In an example, a WTRU may decode multiple DCIs. A (e.g., each) DCI may contain different resource assignments for a (e.g., each) NR-PDSCH (e.g., scheduled RBs, MCS).

In an example, a TRP may configure a panel indicator, for example, to set a start of a search space for a (e.g., each) panel, e.g., when cross panel scheduling may be activated. A TRP may configure search spaces, for example, so that a (e.g., each) panel's DCI may be allocated on its own region of an NR-PDCCH. A WTRU may (e.g., then) decode its multiple panel resource assignments from a (e.g., single) panel.

A starting location of CCEs for a search space of a (e.g., each) panel may be calculated, for example, in accordance with Eq. (1):

$$m' = m + \sum_{x=0}^{n_{PI}-1} M_x^{(L)} \quad (1)$$

where m is the NR-PDCCH candidate index, $M_x^{(L)}$ may be a number of NR-PDCCH candidates at aggregation level L and $n_{PI}$ may be a panel indicator (e.g., ranging from 1 to a number of coordinating panels at a P-TRP).

In an example (e.g., with multiple TRPs), panels may not be collocated (e.g., a first panel may be located on a P-TRP and a second panel may be located on an S-TRP). Coordinating TRPs may perform cross panel scheduling in a similar way. In an example, an NR-PDCCH of a P-TRP may be used to send a DCI for a P-TRP and an S-TRP. The number of panels may, for example, be pooled between coordinating TRPs. A panel indicator may, for example, range from 1 to a number of combined coordinating panels between P-TRP and S-TRP.

Hashing functions may be used to determine the search space locations.

A panel indicator may (e.g., when cross panel scheduling may be activated) be included in a DCI, for example, to inform a WTRU which panel a DCI may correspond to. A TRP may, for example, signal (e.g., through higher layer signaling such as RRC) a WTRU that cross panel scheduling may be active. Cross panel scheduling may (e.g., dynamically) be indicated to the WTRU by the presence of the panel indicator in the DCI.

Cross TRP scheduling may be provided. Multiple TRPs may coordinate (e.g., similar to multi-panel coordination), for example, so that a (e.g., each) TRP may send its own NR-PDSCH to a WTRU. A WTRU's serving cell may be configured as a primary TRP for a WTRU. A primary TRP may perform cross TRP scheduling, for example, by sending (e.g., through a, for example, single, NR-PDCCH) one or more (e.g., all) DCIs that may be intended for multiple TRPs.

FIG. 12 is an example of cross TRP scheduling with two TRPs. In an example, two TRPs may coordinate. A P-TRP may operate as a serving cell to a WTRU. In an example, a (e.g., each) TRP may send its own NR-PDSCH while (e.g., only) a P-TRP may send an NR-PDCCH. A P-TRP may (e.g., also) use cross TRP scheduling, for example, for decoupled downlink/uplink (e.g., as shown in FIG. 13).

Figure 13:
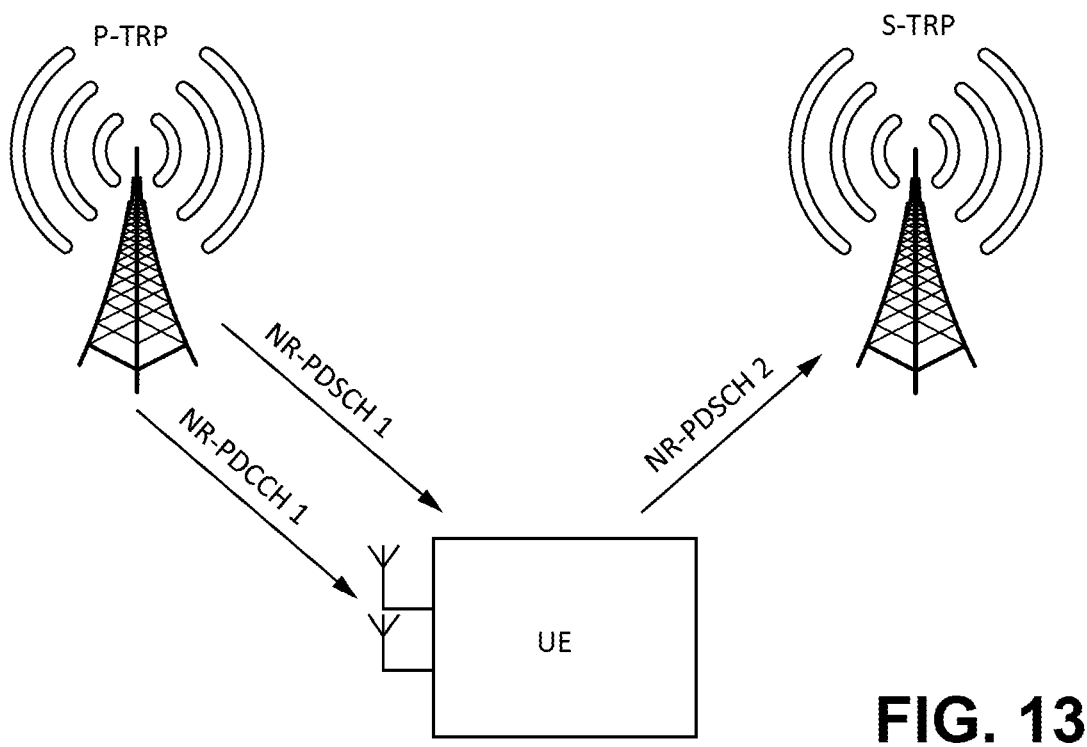
FIG. 13 is an example of cross TRP scheduling with decoupled uplink/downlink.

FIG. 13 is an example of cross TRP scheduling with decoupled uplink/downlink. In an example, a WTRU may receive an NR-PDSCH on a downlink from a (e.g., one) cell. A WTRU may send its NR-PUSCH on an uplink, e.g., towards a second TRP. Multiple (e.g., both) TRPs may coordinate. A P-TRP serving a WTRU on a downlink may send DCIs to the WTRU that may be intended for its own link and for an S-TRP's link. DCIs may be used, for example, for scheduling assignments and/or for power control commands on an uplink towards a second TRP.

In an (e.g., alternative) example, a TRP may configure a TRP indicator to set a start of a search space for a (e.g., each) TRP's DCI, for example, when cross TRP scheduling may be active. A TRP may configure search spaces, for example, so that a (e.g., each) TRP's DCI may be allocated on its own region of an NR-PDCCH. A WTRU may (e.g., then) decode its multiple TRP resource assignments from a (e.g., single) panel.

A starting location of CCEs for a search space of a (e.g., each) panel may be calculated, for example, according to Eq. (2):

$$m' = m + \sum_{x=0}^{n_{TI}-1} M_x^{(L)} \quad (2)$$

where m is the NR-PDCCH candidate index, $M_x^{(L)}$ may be a number of NR-PDCCH candidates at aggregation level L and $n_{TI}$ may be a TRP indicator, ranging from 1 to the number of coordinating TRPs.

A TRP indicator may (e.g., when cross TRP scheduling may be active) be included in a DCI, for example, to inform a WTRU which TRP a DCI may correspond to. A TRP may signal (e.g., through higher layer signaling such as RRC) a WTRU that cross TRP scheduling may be active.

Cross TRP scheduling may (e.g., dynamically) be indicated to the WTRU by the presence of the TRP indicator in the DCI. Multi-layer transmission and Multi-PDSCH transmission from multiple TRPs may be used. Data may be transmitted from multiple TRPs to a WTRU by for example transmitting multiple PDSCHs, each from a (e.g., one) TRP and scheduled by its corresponding PDCCH or by transmitting one PDSCH, scheduled by (e.g., one) PDCCH, using (e.g., different) layers from different TRPs.

The corresponding layers from different TRPs can be on the same or different time and frequency resources for a PDSCH (e.g., a single PDSCH, including multiple layers transmitted from multiple TRPs). Layers may be transmitted on the same time and frequency resources using space division multiple access or simple successive interference cancellation (SIC) (e.g., if they are multiplexed by power-level NOMA). For SIC, the reception may be coherent or non-coherent (e.g., without needing synchronization)

PDCCH may be provided for URLLC in a beam-based system. A monitoring interval may be instituted, for example, for URLLC transmission in beam based systems. A gNB may switch to a beam that may have coverage of a (e.g., large) subset of URLLC WTRUs. URLLC WTRUs and a gNB may negotiate a (e.g., the best) receive beam for a transmit beam. A gNB may transmit a URLLC control channel, e.g., during an interval.

PDCCH for a URLLC WTRUs may be restricted, for example, to an (e.g., one) OFDM symbol. A frequency may be restricted. One or more restrictions may, for example, reduce overhead.

Systems, methods and instrumentalities have been disclosed for beam-based PDCCH Transmission in NR. Control resource sets may be assigned for multi-beam control transmission. A PDCCH may be transmitted with multiple beams. CCEs may be mapped for multi-beam transmission. DCI may support multi-dimensional transmission with primary and secondary dimensions. Search space may support multi-beam, multi-TRP transmission.

Features, elements and actions (e.g., processes and instrumentalities) are described by way of non-limiting examples. While examples may be directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

A WTRU may refer to an identity of the physical device, or to the user's identity such as subscription related identities, e.g., MSISDN, SIP URI, etc. WTRU may refer to application-based identities e.g., user names that may be used per application.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), the WTRU comprising:
a processor, the processor configured to:
determine a first set of control channel elements (CCEs) from a plurality of CCEs, wherein the first set of CCEs is associated with a first beam and a first search space (SS), and wherein the first SS is associated with a first control resource set (CORESET);
determine a second set of CCEs from the plurality of CCEs, wherein the second set of CCEs is associated with a second beam and a second SS, and wherein the second SS is associated with a second CORESET;
determine that the first set of CCEs is associated with the second set of CCEs;
receive at least one of a first physical downlink control channel (PDCCH) transmission using the first beam and the first set of CCEs, or a second PDCCH transmission using the second beam and the second set of CCEs; and
decode a downlink control information (DCI) using the at least one of the first PDCCH transmission or the second PDCCH transmission.

2. The WTRU of claim 1, wherein the processor being configured to determine that the first set of CCEs is associated with the second set of CCEs comprises the processor being configured to determine that the first set of CCEs is associated with the second set of CCEs using the first SS and the second SS.

3. The WTRU of claim 1, wherein the first set of CCEs is different from the second set of CCEs.

4. The WTRU of claim 1, wherein the first set of CCEs is further associated with a first quasi co-location (QCL) information, wherein the second set of CCEs is further associated with a second QCL information, and wherein the first QCL information is different from the second QCL information.

5. The WTRU of claim 1, wherein the first PDCCH transmission and the second PDCCH transmission are associated with a multibeam PDCCH transmission.

6. The WTRU of claim 1, wherein the processor being configured to receive at least one of the PDCCH transmission using the first beam and the first set of CCEs, or the second PDCCH transmission using the second beam and the second set of CCEs comprises the processor being configured to monitor the first set of CCEs using the first beam and the second set of CCEs using the second beam.

7. The WTRU of claim 1, wherein the first set of CCEs is further associated with a first set of orthogonal frequency divisional access (OFDM) symbols, wherein the second set of CCEs is further associated with a second set of OFDM symbols, and wherein the first set of OFDM symbols is different from the second set of OFDM symbols.

8. A method performed by a wireless transmit/receive unit (WTRU), the method comprising:
determining a first set of control channel elements (CCEs) from a plurality of CCEs, wherein the first set of CCEs is associated with a first beam and a first search space (SS), and wherein the first SS is associated with a first control resource set (CORESET);
determining a second set of CCEs from the plurality of CCEs, wherein the second set of CCEs is associated with a second beam and a second SS, and wherein the second SS is associated with a second CORESET;
determining that the first set of CCEs is associated with the second set of CCEs;
receiving at least one of a first physical downlink control channel (PDCCH) transmission using the first beam and the first set of CCEs, or a second PDCCH transmission using the second beam and the second set of CCEs; and
decoding a downlink control information (DCI) using the at least one of the first PDCCH transmission or the second PDCCH transmission.

9. The method of claim 8, wherein determining that the first set of CCEs is associated with the second set of CCEs comprises determining that the first set of CCEs is associated with the second set of CCEs using the first SS and the second SS.

10. The method of claim 8, wherein the first set of CCEs is different from the second set of CCEs.

11. The method of claim 8, wherein the first set of CCEs is further associated with a first quasi co-location (QCL) information, wherein the second set of CCEs is further associated with a second QCL information, and wherein the first QCL information is different from the second QCL information.

12. The method of claim 8, wherein the first PDCCH transmission and the second PDCCH transmission are associated with a multibeam PDCCH transmission.

13. The method of claim 8, wherein the receiving at least one of the PDCCH transmission using the first beam and the first set of CCEs, or the second PDCCH transmission using the second beam and the second set of CCEs comprises monitoring the first set of CCEs using the first beam and the second set of CCEs using the second beam.

14. The method of claim 8, wherein the first set of CCEs is further associated with a first set of orthogonal frequency divisional multiple access (OFDM) symbols, wherein the second set of CCEs is further associated with a second set of OFDM symbols, and wherein the first set of OFDM symbols is different from the second set of OFDM symbols.

15. A wireless transmit/receive unit (WTRU) the WTRU comprising:
a processor, the processor configured to:
determine a plurality of control channel elements (CCEs) that are associated with a control resource set (CORESET);
determine a set of CCEs from the plurality of CCEs;
receive a first physical downlink control channel (PDCCH) transmission using a first beam and a second PDCCH transmission using a second beam, wherein the first beam is associated with the set of CCEs, and wherein the second beam is associated with the set of CCEs; and
decode a downlink control information (DCI) using at least one of the first PDCCH transmission or the second PDCCH transmission.

16. The WTRU of claim 15, wherein the CORESET indicates a first quasi collocated (QCL) information associated with the first beam and indicates a second QCL associated with the second beam.

17. The WTRU of claim 15, wherein the set of CCEs is associated with a search space.

18. The WTRU of claim 15, wherein the first PDCCH transmission and the second PDCCH transmission are associated with a multibeam PDCCH transmission.

19. The WTRU of claim 15, wherein the processor being configured to receive the first PDCCH transmission using the first beam and the second PDCCH transmission using the second beam comprises the processor being configured to monitor the set of CCEs using the first beam and the second beam.

* * * * *